(12) United States Patent
Jackson

(10) Patent No.: US 11,122,923 B2
(45) Date of Patent: Sep. 21, 2021

(54) THERMAL REGULATION AND STABILIZATION VESSEL

(71) Applicant: Goldi Holdings LLC, Salt Lake City, UT (US)

(72) Inventor: Jeffrey K. Jackson, Murray, UT (US)

(73) Assignee: Goldi Holdings LLC, Salt Lake City, UT (US)

( * ) Notice: Subject to any disclaimer, the term of this patent is extended or adjusted under 35 U.S.C. 154(b) by 0 days.

(21) Appl. No.: 16/150,056

(22) Filed: Oct. 2, 2018

(65) Prior Publication Data

US 2019/0099027 A1    Apr. 4, 2019

Related U.S. Application Data

(60) Provisional application No. 62/566,905, filed on Oct. 2, 2017, provisional application No. 62/643,508, filed on Mar. 15, 2018.

(51) Int. Cl.
*A47G 23/02* (2006.01)
*A47G 23/04* (2006.01)
(Continued)

(52) U.S. Cl.
CPC ......... *A47G 23/04* (2013.01); *A47G 23/0241* (2013.01); *A47J 41/005* (2013.01);
(Continued)

(58) Field of Classification Search
CPC ............ B65D 81/3881; B65D 81/3876; B65D 81/3879; B65D 81/3883; B65D 81/38;
(Continued)

(56) References Cited

U.S. PATENT DOCUMENTS

| 4,022,327 | A | * | 5/1977 | Anderson | ............... A47B 73/00 |
| | | | | | 211/74 |
| 4,255,944 | A | * | 3/1981 | Gardner | ............. B65D 81/3876 |
| | | | | | 62/371 |

(Continued)

FOREIGN PATENT DOCUMENTS

| CN | 202426896 | 9/2012 |
| DE | 1982856 | 4/1968 |

(Continued)

OTHER PUBLICATIONS

Formal Human Translation of Toyomura JP3203301. Published Mar. 2016. (Year: 2016).*

(Continued)

*Primary Examiner* — Ericson M Lachica
(74) *Attorney, Agent, or Firm* — Warren M. Pate; Pate Peterson, PLLC

(57) ABSTRACT

A thermal stabilization vessel may include a double walled tube. The tube may have an outer wall, an inner wall, and a sealed off volume located between the inner and outer walls. A removable base may close off a bottom opening of the tube and conduct heat to or from a container placed within the vessel. A top may partially close off a top opening of the tube. The top may include an annulus of elastomeric material. The annulus may have a plurality of resilient tabs extending radially inward toward a central axis of the tube. When a container such as a bottle of wine is placed within a vessel, the tabs of the annulus may resiliently deflect as needed to accommodate the container and then restrict air exchange between an ambient environment and a space located interior to the inner wall of the tube and exterior to the container.

10 Claims, 24 Drawing Sheets

(51) Int. Cl.
  *A47J 41/00* (2006.01)
  *A47J 41/02* (2006.01)
  *C12G 1/00* (2019.01)
(52) U.S. Cl.
  CPC ......... *A47J 41/0072* (2013.01); *A47J 41/028* (2013.01); *A47G 2023/0275* (2013.01); *C12G 1/00* (2013.01)
(58) Field of Classification Search
  CPC ............ B65D 81/3886; B65D 81/3858; B65D 25/00; B65D 3/22; F25D 3/08; F25D 31/002; F25D 31/006; A47G 23/04; A47G 23/0241; A47G 23/02; A47G 23/0208; A47G 23/0266; A47G 2023/0291; A47G 2023/0275; A47J 41/005; A47J 41/0072; A47J 41/00; A47J 41/02; A47J 41/022; A47J 41/024; A47J 41/026; A47J 41/028; A23G 2023/0275; A23G 2023/0283; C12G 1/00; B60N 3/10; B60N 3/105; B60N 3/106; B60N 3/107; B60N 3/108; B60N 3/103; B60N 3/104
  See application file for complete search history.

(56) References Cited

U.S. PATENT DOCUMENTS

| | | | | |
|---|---|---|---|---|
| 4,299,100 A * | 11/1981 | Crisman | ............ | B65D 81/3883 220/592.17 |
| 4,549,410 A * | 10/1985 | Russell | ............ | B65D 81/3886 215/13.1 |
| 4,768,354 A * | 9/1988 | Barnwell | ........... | B65D 81/3883 220/592.17 |
| 4,870,837 A * | 10/1989 | Weins | ................ | B65D 81/3883 62/457.4 |
| 4,882,914 A * | 11/1989 | Haines-Keeley | .. | B65D 81/3883 62/457.4 |
| 5,326,064 A * | 7/1994 | Sapien | ..................... | B60N 3/10 224/926 |
| 5,955,163 A * | 9/1999 | White | .................... | B65D 41/12 215/256 |
| 6,357,253 B1 | 3/2002 | Condy | | |
| 6,405,892 B1 * | 6/2002 | Volan | ................. | A47G 19/2288 215/12.1 |
| 7,032,409 B1 * | 4/2006 | Worsham | ............. | F25D 31/007 220/592.2 |
| 8,621,885 B1 * | 1/2014 | Niebolte | ............... | F25D 31/002 62/457.4 |
| 9,505,527 B1 * | 11/2016 | Campbell | ............. | B65D 41/04 |
| 2003/0070951 A1 * | 4/2003 | Hurley | ................. | B65D 81/133 206/427 |
| 2003/0146227 A1 * | 8/2003 | Shimazaki | ........... | F25D 31/007 220/737 |
| 2005/0056610 A1 * | 3/2005 | Randolph | ............... | A61J 9/001 215/11.1 |
| 2006/0043250 A1 * | 3/2006 | Farrell | ............... | B65D 81/3879 248/311.2 |
| 2007/0062961 A1 * | 3/2007 | Rigas | ................. | A47G 19/2205 220/703 |
| 2008/0169297 A1 * | 7/2008 | Kelly | .................. | A47J 41/0077 220/592.16 |
| 2008/0197037 A1 * | 8/2008 | O'Brien | ............... | B65D 81/133 206/429 |
| 2008/0302127 A1 * | 12/2008 | Cote | ........................ | F25D 3/08 62/457.7 |
| 2009/0173862 A1 * | 7/2009 | Lota | ........................ | B60N 3/10 248/311.2 |
| 2012/0241446 A1 * | 9/2012 | Schwartz | ................. | B65D 7/04 220/4.21 |
| 2013/0341295 A1 * | 12/2013 | Dixon | .................. | A47B 81/007 211/74 |
| 2014/0124513 A1 * | 5/2014 | Shearer | ............. | A47G 19/2261 220/592.17 |
| 2014/0263368 A1 * | 9/2014 | Booska | ............. | B65D 81/3484 220/592.17 |
| 2014/0284342 A1 * | 9/2014 | Hewitt | ............... | B65D 81/3881 220/592.24 |
| 2015/0135728 A1 * | 5/2015 | Swanson | .................. | F25B 21/02 62/3.64 |
| 2015/0216343 A1 * | 8/2015 | Price | ........................ | C03C 27/10 220/592.17 |
| 2016/0175782 A1 * | 6/2016 | Lau | ..................... | B01F 3/04794 261/76 |
| 2016/0185198 A1 * | 6/2016 | Escher | ....................... | B60J 7/22 296/217 |
| 2018/0111722 A1 * | 4/2018 | Deutsch | ................. | B65D 45/02 |

FOREIGN PATENT DOCUMENTS

| | | |
|---|---|---|
| JP | 2001151238 | 6/2001 |
| JP | 3203301 B2 * | 8/2001 |
| WO | WO 2008078860 | 7/2008 |

OTHER PUBLICATIONS

Beckett, Fiona. "How to store open bottles of wine." Jun. 6, 2016. <https://www.theguardian.com/lifeandstyle/shortcuts/2016/jun/06/storing-wine-correctly-reds-kept-in-fridge>. Accessed Jan. 23, 2020. (Year: 2016).*
International Search Report and Written Opinion of the International Searching Authority for International Application No. PCT/US2018/054025, dated Jan. 21, 2019, pp. 1-11.
Copper Cooler Rapid Beverage Cooler, http://coopercooler.com, accessed Mar. 27, 2018, pp. 1-19.
Final Touch Stainless-Steel Wine Chiller, www.williams-sonoma.com, accessed Mar. 27, 2018, pp. 1-3.
HOMEARD Ice Bucket, www.amazon.com, accessed Mar. 27, 2018, pp. 1-9.
Stainless-Steel Copper Wine Chiller, www.williams-sonoma.com, accessed Mar. 27, 2018, pp. 1-4.
Vacu Vin Prestige Stainless-Steel Tabletop Wine Cooler, www.amazon.com, accessed Mar. 27, 2018, pp. 1-8.
Vinglace Wine Chiller, https://www.vinglace.com/collections/all, accessed Mar. 27, 2018, pp. 1-2.
VonShef Wine Bottle Cooler, www.amazon.com, accessed Mar. 27, 2018, pp. 1-7.
Waring PC100 Wine Chiller, www.waringpro.com, accessed Mar. 27, 2018, pp. 1-2.
WIlliams Sonoma "Wine Cooler" Listings, www.williams-sonoma.com, accessed Mar. 27, 2018, pp. 1-17.
Yeti Rambler Colster, https://www.yeti.com/drinkware/colster/YRAMCOLSTER.html, accessed Mar. 27, 2018, pp. 1-9.

* cited by examiner

THERMAL REGULATION AND STABILIZATION VESSEL

RELATED APPLICATIONS

This application claims the benefit of co-pending U.S. Provisional Patent Application Ser. No. 62/566,905 filed Oct. 2, 2017 and U.S. Provisional Patent Application Ser. No. 62/643,508 filed Mar. 15, 2018, which are both hereby incorporated by reference.

BACKGROUND

The Field of the Invention

This invention relates to temperature regulation and, more particularly, to novel systems and methods for consistently serving beverages at or near their optimal serving temperatures.

The Background Art

Beverages are often stored at temperatures that are different from their optimal serving temperatures. Additionally, beverages served at their optimal serving temperatures do not tend to stay there. Accordingly, what is needed are systems and methods that enable beverages to be consistently served at or near their optimal serving temperatures.

BRIEF DESCRIPTION OF THE DRAWINGS

The foregoing and other objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which.

DETAILED DESCRIPTION OF SELECTED EMBODIMENTS

Figure 1:
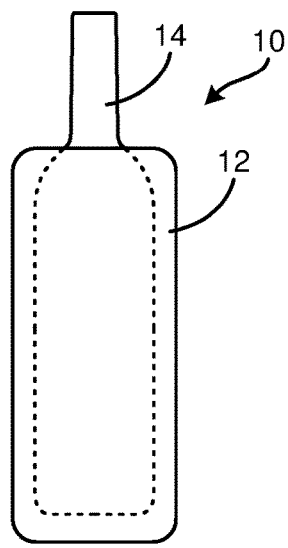
FIG. 1 is a schematic illustration of a system in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, certain beverages are assigned or generally believed to have optimal serving temperatures. For example, it is said that milk is most safe and tastes best when served at a temperature in the range of 35 to 40° F. Conversely, hot chocolate is frequently served at a temperature in the range of 160 to 185° F. Reds wines are said to have an optimal serving temperature of about 62 to about 68° F. However, white wines are said to have an optimal serving temperature of about 49 to about 55° F. Thus, different beverages have different optimal serving temperatures. Moreover, more often than not, the optimal serving temperature of a beverage will not be room temperature (e.g., about 73° F.).

In certain situations, there may be a significant period of time between when a beverage is served and when it is consumed. For example, a bottle of wine may not be consumed or fully consumed until more than an hour or two after it was served (e.g., placed on a restaurant table). Over time, the temperature of a beverage that has been served, but not yet consumed, may drift toward room temperature. For example, within a room temperature environment, a glass of milk served at 35° F. may over time warm significantly as heat transfers from the surrounding air, supporting table, or the like to the milk. Similarly, a bottle of wine delivered to a table at an optimal serving temperature may have departed significantly from that optimal temperature by the time it is consumed.

A system 10 in accordance with the present invention may include a vessel 12 and a beverage container 14. A vessel 12 may be configured to receive a beverage container 14 therewithin. When a beverage container 14 is placed within a vessel 12, the vessel 12 may combat temperature drift of a beverage within the beverage container 14.

In the figures accompanying the present disclosure, the beverage container 14 is a wine bottle. However, vessels 12 in accordance with the present invention may be sized and shaped to receive other kinds of beverage containers 14 (e.g., beverage containers 14 containing a soft drink, milk, juice, an alcoholic beverage, tea, hot chocolate, coffee, water, or the like). Thus, in the present disclosure, wine bottles and wine are used by way of example and not by way of limitation.

Figure 2:
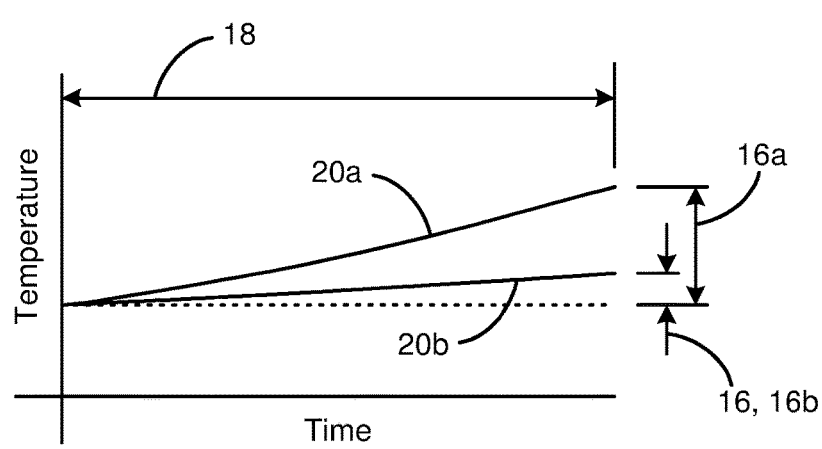
FIG. 2 is a graph illustrating multiple temperature-versus-time curves that illustrate what may be accomplished within a drift-reduction mode in accordance with the present invention.

FIG. 2, in selected embodiments, a vessel 12 in accordance with the present invention may operate in drift-reduction mode. In drift-reduction mode, a vessel 12 may simply reduce the flow of heat into or out of the corresponding beverage container 14. Accordingly, in drift-reduction mode, the goal of a vessel 12 may be to maintain the temperature of a beverage at the same temperature it had at the time the corresponding beverage container 14 was placed within the vessel 12. Thus, the performance of a vessel 12 may be characterized by a change in temperature 16 over a particular period of time 18. The smaller the change in temperature 16, the better the performance of the vessel 12.

For example, in the illustrated graph, a first curve 20a may represent the temperature with respect to time of a beverage when the corresponding beverage container 14 is simply removed from a relatively cool space (e.g., a refrigerator) and placed in an environment at room temperature. A second curve 20b may represent the temperature with respect to time of a beverage when the corresponding beverage container 14 is removed from the same relatively cool space and placed within a vessel 12. As can be seen, the change in temperature 16b of the second curve 20b may be much less than the change in temperature 16a of the first curve 20a. Thus, a vessel 12 in drift-reduction mode may reduce the flow of heat between a surrounding environment and a beverage container 14.

Figure 3:
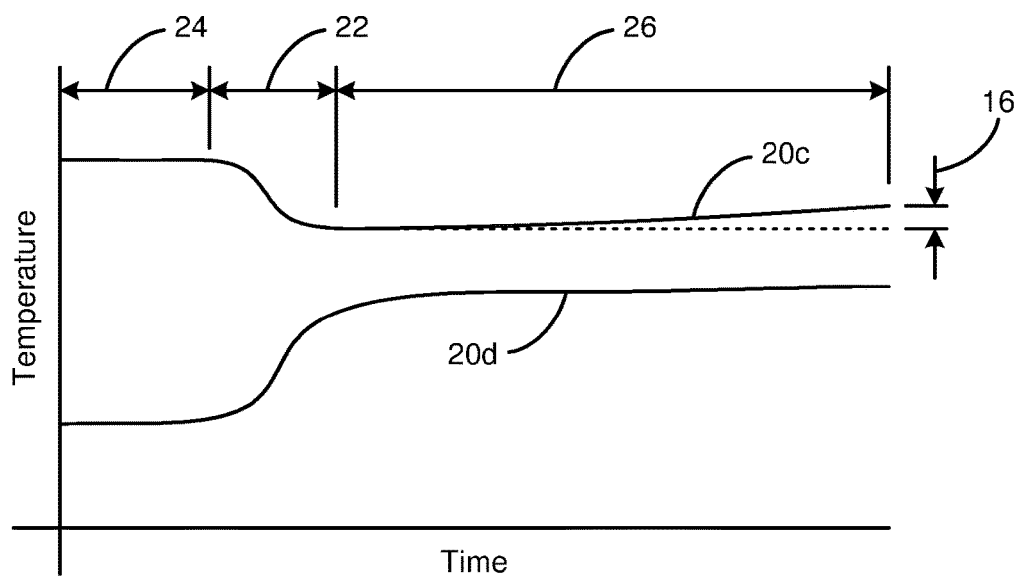
FIG. 3 is a graph illustrating multiple temperature-versus-time curves that illustrate what may be accomplished within heat-exchange and drift-reduction modes in accordance with the present invention.

FIG. 3, in selected embodiments, a vessel 12 in accordance with the present invention may, for a particular period of time 22, operate in a heat-exchange mode. In a heat-exchange mode, a vessel 12 may enable two or more thermal masses to exchange heat until they reach an equilibrium temperature. This may happen in a controlled environment that is largely thermally isolated from a surrounding environment. In selected embodiments, a beverage container 14 and the beverage therewithin may be two of the thermal masses participating in the exchange of heat. Accordingly, in heat-exchange mode, the goal of a vessel 12 may be to transition a beverage container 14 and the beverage therewithin to a new temperature.

In certain embodiments, the relative starting temperatures, relative sizes, types of materials, etc. of the two or more thermal masses may be selected or tuned to control or set an equilibrium temperature. For example, the relative starting temperatures, relative sizes, types of materials, etc. of the two or more thermal masses, which masses include a beverage within the beverage container 14, may be mathematically or empirically selected or tuned in order to control or set the equilibrium temperature to an optimal serving temperature of the beverage. Thus, in a heat-exchange mode, a system 10 may transition a beverage within a beverage container 14 from some first temperature (e.g., a storage temperature) to an optimal serving temperature corresponding to that beverage. As a heat-exchange mode ends (i.e., as an equilibrium temperature is reached by two or more thermal masses), a vessel 12 may transition to a drift-reduction mode.

For example, for some period of time 24, a beverage container 14 and the beverage therewithin may be held at a particular temperature (e.g., a storage temperature) at a location outside of a vessel 12. When the time to serve the beverage arrives, the corresponding beverage container 14 may be placed within a vessel 12. This placement may initiate a heat-exchange mode, which may last for a second period of time 22. Once an equilibrium temperature is reached, a vessel 12 may reduce the flow of heat into or out of the corresponding beverage container 14. Accordingly, in drift-reduction mode, the vessel 12 may maintain the temperature of a beverage at or near the equilibrium temperature.

In the illustrated graph, a third curve 20c may represent the temperature with respect to time of a beverage (e.g., red wine) that is stored at a first temperature (e.g., 73° F.) and has an optimal serving temperature that is below the first temperature (e.g., in the range from about 62 to about 68° F.). A fourth curve 20d may represent the temperature with respect to time of a beverage (e.g., white wine) that is stored at a second temperature (e.g., 35° F.) and has an optimal serving temperature that is above the second temperature (e.g., in the range from about 49 to about 55° F.).

As can be seen, during a first period of time 24, the respective beverages are being held at respective storage temperatures. When the beverage containers 14 are removed from storage and placed within a respective vessel 12, the first period of time 24 ends and the respective systems 10 enter heat-exchange mode.

For the third curve, a relatively cold thermal mass within or forming part of a vessel 12 is combined with a relatively warm beverage. Accordingly, the equilibrium temperature may be below the storage temperature. If the beverage were red wine stored at room temperature, the material, starting temperature, and size of the relatively cold thermal mass may be selected so that the equilibrium temperature would fall in the range of about 62 to about 68° F.

For the forth curve, a relatively warm thermal mass within or forming part of a vessel 12 is combined with a relatively cold beverage. Accordingly, the equilibrium temperature may be above the storage temperature. If the beverage were white wine stored at refrigerator temperature, the material, starting temperature, and size of the relatively warm thermal mass may be selected so that the equilibrium temperature would fall in the range of about 49 to about 55° F.

After a second period of time 22, the various thermal masses within the respective systems 10 may reach an equilibrium temperature. This may bring a close to the heat-exchange mode and bring in a drift-reduction mode for the respective systems 10. Thus, for a third period of time 26, the beverages within the respective vessels 12 may be held as close as possible to the equilibrium temperature. In selected embodiments, this may provide an extended period of time 26 within which one or more beverages may be served at or very near the equilibrium temperature. Since the equilibrium temperature may be tuned to be an optimal serving temperature, a vessel 12 operating in drift-reduction mode may provide an extended period of time 26 within which one or more beverages may be served at or very near an optimal serving temperature.

In selected embodiments, a vessel 12 in accordance with the present invention may operate in heat-exchange mode over an extended period time (e.g., for multiple shorter periods of time 22 that collectively add up to an extended period of time). In such embodiments, the rate of heat transfer between a beverage container 14 and a corresponding thermal mass (e.g., a cooler thermal mass) of a vessel 12 may be relatively low. Accordingly, the resulting rate of change in temperature of the beverage container 14 after it is placed within the vessel 12 may be small.

For example, a beverage container 14 and the beverage therewithin may be stored at an optimal serving temperature at a location outside of a vessel 12 (e.g., within an electric wine refrigerator or cooler). When the time to serve the beverage arrives, the corresponding beverage container 14 may be removed from that location and placed within a vessel 12. This placement may initiate an extended heat-exchange mode.

The rate of heat transfer during an extended heat-transfer mode may be sized to combat or cancel out heat incursion into the beverage container 14 caused by an inability of a vessel 12 to perfectly block all heat transfer into a system 10, heat transfer between surrounding air and an exposed portion of the beverage container 14 (i.e., the portion of the beverage container 14 extending out of a vessel 12), repeated removal of the beverage container 14 from the vessel 12 in order to serve the beverage contained therewithin, or the like. Accordingly, as heat slowly enters a beverage container 14 from a surrounding environment, that heat may be conducted away to a cooler thermal mass of a vessel 12 in order to hold the temperature of the beverage within the beverage container 14 at or near an optimal serving temperature for an extended period of time.

Figure 4:
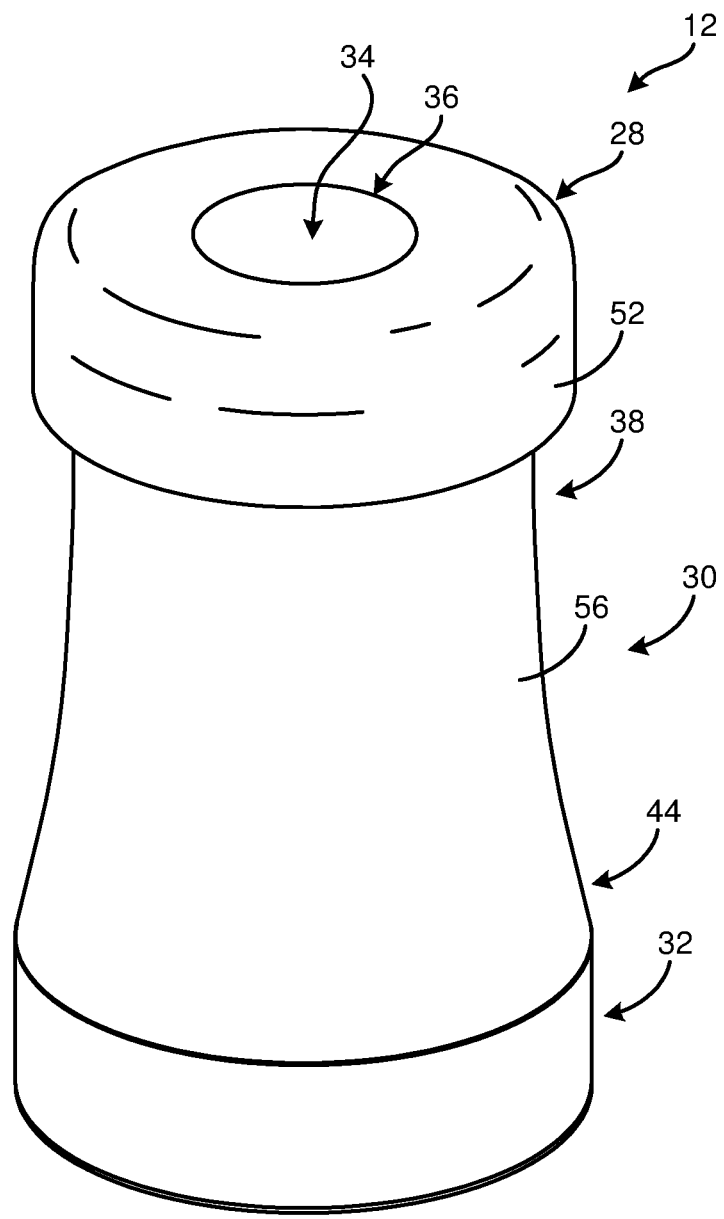
FIG. 4 is a perspective view of one embodiments of a vessel in accordance with the present invention.
Figure 5:
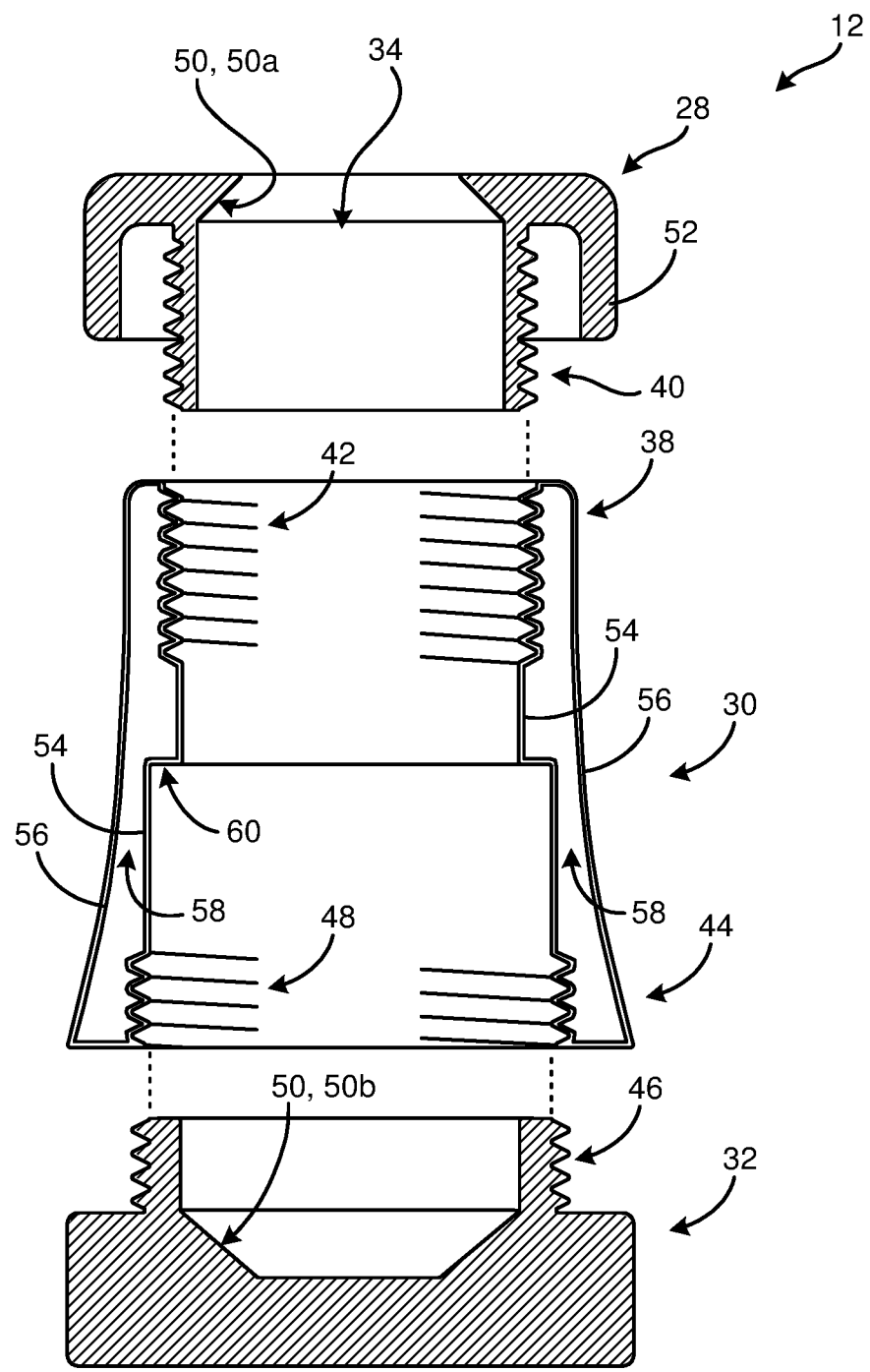
FIG. 5 is an exploded, cross-sectional view of the vessel of FIG. 4.
Figure 6:
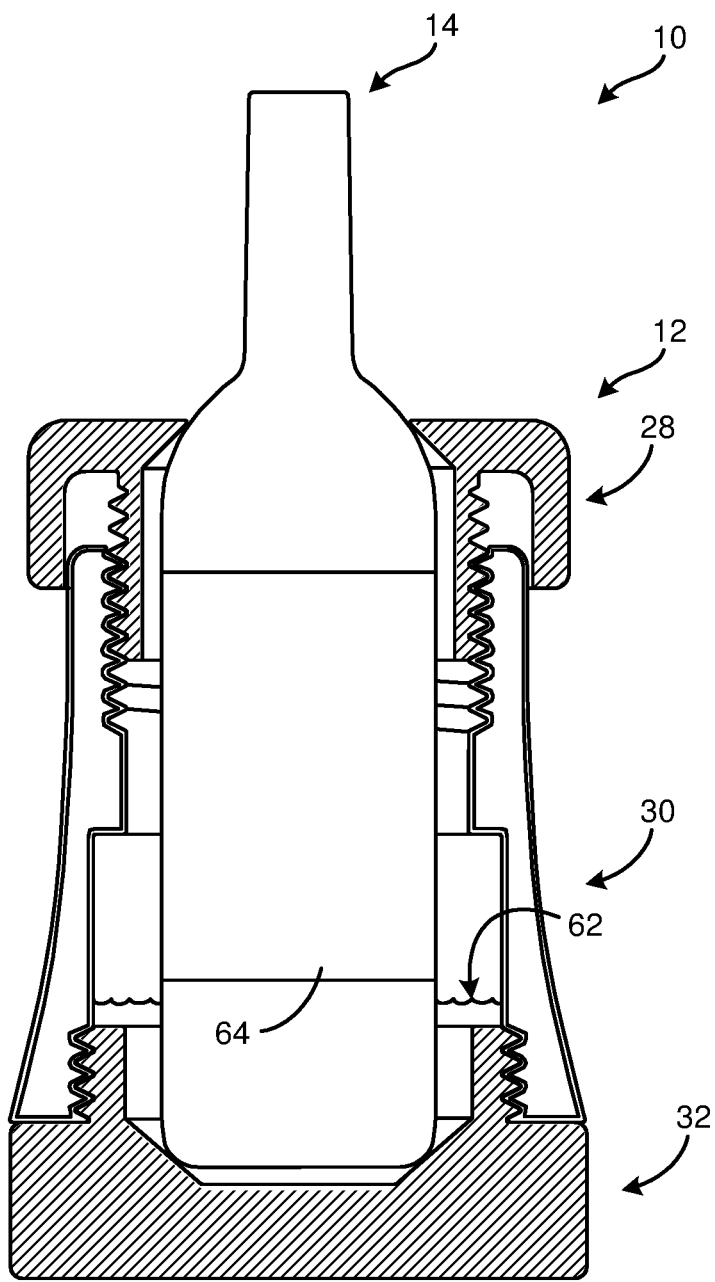
FIG. 6 is a cross-sectional view of the vessel of FIG. 4 with a beverage container that is not shown in cross-section contained therewithin.

Referring to FIGS. 4-6, in selected embodiments, a vessel 12 in accordance with the present invention may include a top 28, body 30, base 32, or combination or sub-combination thereof. Tops 28, bodies 30, and/or bases 32 may be modular devices or components. Thus, for different situations or applications, different tops 28, bodies 30, and/or bases 32 may be selected and assembled to provide a vessel 12 having a desired combination of characteristics or functionality.

When assembled, a top 28, body 30, and base 32 may define a cavity 34 that may be sized and shaped to receive a beverage container 14 or a portion (e.g., the majority) thereof. In certain embodiments, a portion of a beverage container 14 may extend out of a vessel 12. For example, a top 28 may include an aperture 36 through which a top portion of a beverage container 14 may extend out of the corresponding vessel 12.

In certain embodiments, a top 28 may connect to a top portion 38 of a body 30. For example, a top 28 may include a first engagement mechanism 40 and a top portion 38 of a body 30 may include a second engagement mechanism 42. The first engagement mechanism 40 may be shaped and sized to selectively engage the second engagement mechanism 42. Accordingly, a user may manipulate a top 28 with respect to a body 30 in order to engage the first and second engagement mechanisms 40, 42 and, thereby, connect a top 28 to a body 30. Alternatively, a user may manipulate a top 28 with respect to a body 30 in order to disengage the first and second engagement mechanisms 40, 42 and, thereby, disconnect the top 28 from the body 30.

In selected embodiments, the first and second engagement mechanisms 40, 42 may comprise continuous single start threads, continuous multi-start threads, interrupted threads or ramp segments, interrupted segments (e.g., interrupted unthreaded segments), or the like. Interrupted threads or ramp segments may provide a faster connection than continuous threads because opposing threads or ramps are able to translate axially past each other before relative rotation causes an engagement therebetween. Thus, the bulk of the relative axial engagement between a top 28 and a body 30 may occur before opposing threads or ramps are rotated into engagement and the final tightening occurs in a traditional threaded manner. In selected embodiments, this may allow a user to quickly adjust the location of a top 28 with respect to a body 30 to accommodate beverage containers 24 of various heights.

In certain embodiments, a base 32 may connect to a bottom portion 44 of a body 30. For example, a base 32 may include a third engagement mechanism 46 and a bottom portion 44 of a body 30 may include a forth engagement mechanism 48. The third engagement mechanism 46 may be shaped and sized to selectively engage the forth engagement mechanism 48. Accordingly, a user may manipulate a base 32 with respect to a body 30 in order to engage the third and forth engagement mechanisms 46, 48 and, thereby, connect a base 32 to a body 30. Alternatively, a user may manipulate a base 32 with respect to a body 30 in order to disengage the third and forth engagement mechanisms 46, 48 and, thereby, disconnect the base 32 from the body 30.

In selected embodiments, the third and forth engagement mechanisms 46, 48 may comprise continuous single start threads, continuous multi-start threads, interrupted threads or ramp segments, interrupted segments (e.g., interrupted unthreaded segments), or the like. Like interrupted threads, interrupted segments may provide a faster connection than continuous threads because opposing segments are able to translate axially past each other before relative rotation effects an engagement therebetween. Thus, the bulk of the relative axial engagement between a base 32 and a body 30 may occur before opposing segments are rotated into engagement. Unlike interrupted threads or ramp segments, however, interrupted segments need not thread or ramp during rotation. Rather, they may simply mechanically mesh in some manner so as to prevent inadvertent axial separation of a base 32 and body 30. In selected embodiments, a semi-captive rubber O-ring may be positioned between the two components 30, 32 so that the O-ring is compressed when the segments engage one another. The resilience of the O-ring may therefore provide a desired preload along a central, vertical axis of the corresponding vessel 12. This preload may maintain the segments in their engaged position by increasing a frictional engagement therebetween.

In certain embodiments, a vessel 12 may be configured to secure a beverage container 14 therewithin. For example, in an assembly process, a base 32 may be connected to a bottom portion 44 of a body 30. A beverage container 14 may then be placed within a cavity 34 of the combined body 30 and base 32. Thereafter, a top 28 may be applied in order to secure or lock the beverage container 14 within that cavity 34.

Different beverage containers 14, even those of the same type, may have different dimensions. For example, most wine bottles have a similar shape and size, but some may be a little taller and/or wider than others. Accordingly, in selected embodiments, a top 28 may have an axial range of motion with respect to a body 30 in order to accommodate beverage containers 14 of differing heights.

That is, a top 28 may have a more shallow engagement with a body 30 in order to secure taller beverage containers 14 and a deeper engagement with a body 30 in order to secure shorter beverage containers 14. In selected embodiments, threaded engagements (e.g., continuous single start threads, continuous multi-start threads, interrupted threads, and the like) between the first and second engagement mechanisms 40, 42 may continuously support, within an axial range of motion, a suitable connection at both the more shallow engagement and the deeper engagement and an unlimited number of engagements therebetween.

Alternatively, or in addition thereto, one or more of a top 28 and a base 32 may include a centering chamfer 50. A centering chamfer 50 may accommodate beverage containers 14 of various widths or diameters by extending around a circumference of a cavity 34. Wider beverage containers 14 may contact a centering chamfer 50 at a wider diameter thereof, while narrower beverage containers 14 may settle a litter deeper and contact a centering chamfer 50 at a narrower diameter thereof. Thus, within a certain range of acceptable widths, a centering chamfer 50a formed in a top 28 may contact and center a top of a beverage container 14 within the cavity 34 and a centering chamfer 50b formed in a base 32 may contact and center a bottom of a beverage container 14 within the cavity 34.

A top 28 may include a shroud 52 or skirt 52 to provide an aesthetically pleasing and visually consistent interface between the top 28 and a corresponding body 30. In selected embodiments, a shroud 52 may extend axially as well as circumferentially in order to cover a first engagement mechanism 40. Thus, a shroud 52 may ensure that a first engagement mechanism 40 remains unseen from the exterior of the vessel 12 regardless of whether the top 28 has a more shallow engagement with a body 30, a deeper engagement with a body 30, or somewhere in between.

In selected embodiments, a beverage container 14 may be removed from a vessel 12 before the corresponding beverage is served. This may include removing a top 28 in order to free a beverage container 14 to be lifted out of a cavity 34. Alternatively, a beverage container 14 may not be removed from a vessel 12 before the corresponding beverage is served. Thus, the whole system 10 may be picked up and tilted to pour the beverage from the beverage container 14.

A body 30 may be configured to reduce the ability of heat to pass therethrough. In selected embodiments, a body 30 may be or form a double walled tube and include an inner wall 54 and an outer wall 56. The inner and outer walls 54, 56 may be spaced (e.g., in a radial direction) from one another in order to form a space 58 therebetween. The inner and outer walls 54, 56 may meet with each other at both the top portion 38 of the body 30 and the bottom portion 44 thereof. Thus, a body 30 and the space 58 between the inner and outer walls 54, 56 thereof may have the shape of an annulus or of an annular cylinder.

In selected embodiments, the space 58 between the inner and outer walls 54, 56 may contain air at atmospheric pressure. In such embodiments, the double wall configuration of a body 10 may significantly and acceptably slow the flow of heat into a cavity 34. In other embodiments, the space 58 between the inner and outer walls 54, 56 may be filled with an insulating foam or solid. In still other embodiments, the space 58 between the inner and outer walls 54, 56 may have gas molecules therewithin at a concentration that is less (e.g., significantly less) than that found in the surrounding ambient air. That is, a pressure within the space 58 may be less (e.g., significantly less) than atmospheric pressure. Thus, in certain embodiments, a body 30 may be vacuum insulated (e.g., be or comprise a vacuum insulated pipe or tube that is open at both ends and defines an interior cavity 34 that extends from one end to the other). This may reduce the ability of heat to convect from an outer wall 56 to an inner wall 54 or vice versa and, thereby, improve the performance of the corresponding vessel 12 in drift-reduction mode or the like.

An exterior of a body 30 (e.g., an exterior of an outer wall 56) may be shaped so as to be aesthetically pleasing. In selected embodiments, an exterior of a body 30 may be generally cylindrical. In certain embodiments, the diameter of the exterior near the top 38 may be less than the diameter of the exterior near the bottom 44. In selected embodiments, the transition from a narrower top 38 to a wider bottom 44 maybe smooth (e.g., gradual) and/or continuous (e.g., non-reversing). Alternatively, or in addition thereto, the transition from a narrower top 38 to a wider bottom 44 may be non-linear. That is, a rate of change in diameter may not be uniform with respect to changes in height along the body 30. Accordingly, in selected embodiments, an exterior of a body 30 may flare out non-linearly proximate a bottom portion and/or top portion thereof to produce a shape reminiscent of the flare of a bell.

An interior of a body 30 (e.g., an interior of an inner wall 54) may be shaped so as to be functional. In selected embodiments, an interior of a body 30 may have second and/or forth engagement mechanisms 42, 48 formed therein. In certain embodiments, an interior of a body 30 may have one or more shoulders 60 formed therein. Such shoulders 60 may provide a desired volume within a cavity 34, provide abutting services for clamping or tightening one or more components, or the like.

Inner and outer walls 54, 56 of a body 30 may be formed of any suitable material or combination of materials. In certain embodiments, inner and outer walls 54, 56 may be formed of or comprise thin metal (e.g., thin steel or stainless steel that is formed into the desired shape and then joined together to seal off the space 58 therebetween).

In selected embodiments, a base 32 may function as a thermal mass. In a heat-exchange mode, heat may flow from a base 32 to a beverage within a beverage container 14 or from the beverage to the base 32 until an equilibrium temperature is reached. Accordingly, the initial temperature, mass, and material of a base 32 may be mathematically or empirically selected so that a resulting equilibrium temperature matches an optimal serving temperature for the corresponding beverage.

In certain embodiments, a base 32 may be formed of a material that has a relatively high specific heat. This may enable the lightest base 32 to have the greatest effect on the equilibrium temperature. In selected embodiments, a base 32 may comprise steel or aluminum and have a mass in the range of about 0.3 to about 2 kilograms.

In selected embodiments, a system 10 in accordance with the present invention may include a thermal conductor 62. A thermal conductor 62 may be material that facilitates the exchange or flow of heat between a base 32 and a beverage container 14. Thus, a thermal conductor 62 may shorten the time period 22 corresponding to a heat-exchange mode (e.g., shorten the time needed to reach an equilibrium temperature).

In certain embodiments, a thermal conductor 62 may comprise a quantity of water that is place within a cavity 34. Thus, when a vessel 12 is positioned upright, the water may thermally connect a base 32 with a beverage container 14. The amount and initial temperature of the water may be selected, tuned, or otherwise factored in when the equilibrium temperature is mathematically or empirically projected or determined. Accordingly, the amount and initial temperature of the water may be another variable that may be controlled in order to make an equilibrium temperature match a particular optimal serving temperature.

In selected embodiments, the amount of water used as a thermal conductor 62 may be such that the water does not contact or reach a label 64 on a corresponding beverage container 14. Such labels often comprise paper, inks, etc. that are adversely affected by water. Accordingly, by using an amount of water that does not contact or reach a label 64, the integrity, aesthetic appeal, etc. of the label 64 may be preserved.

Figure 7:
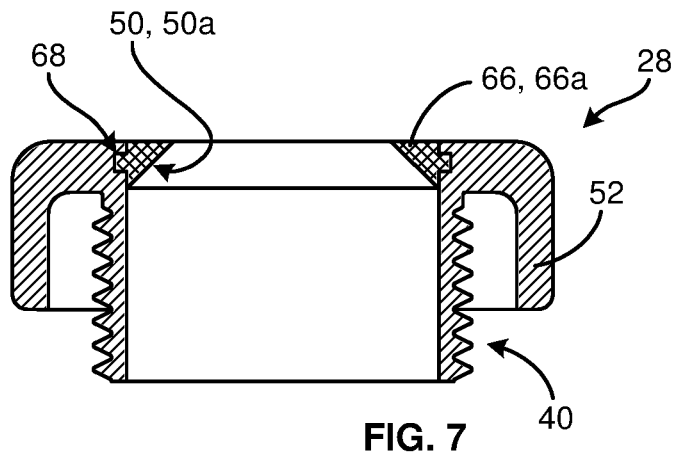
FIG. 7 is a cross-sectional view of an alternative embodiment of a top of a vessel in accordance with the present invention.
Figure 8:
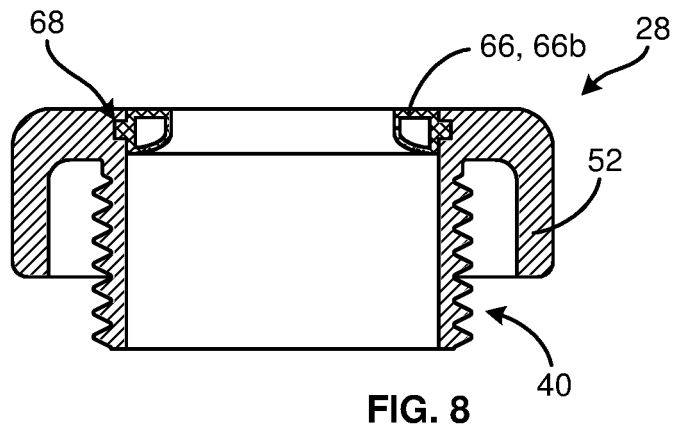
FIG. 8 is a cross-sectional view of another alternative embodiment of a top of a vessel in accordance with the present invention.
Figure 9:
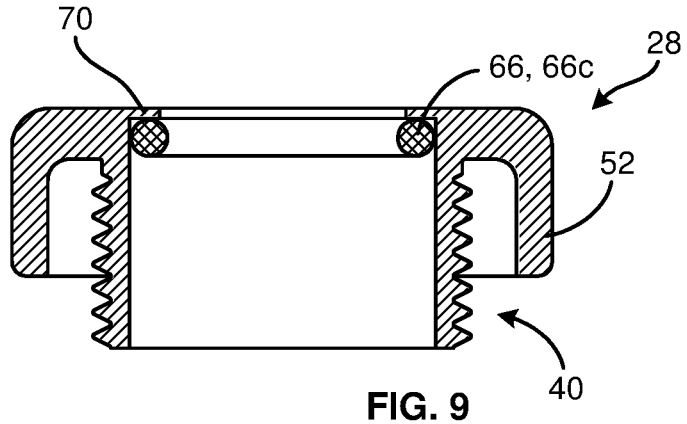
FIG. 9 is a cross-sectional view of another alternative embodiment of a top of a vessel in accordance with the present invention.

Referring to FIGS. 7-9, in certain embodiments, a vessel 12 may include a seal 66. A seal 66 may resist or prevent the flow or movement of fluids in and/or out of a cavity 34 via a gap or space between a vessel 12 and a beverage container 14. A seal 66 may form another barrier for heat flowing into or out of a system 10. That is, by resisting or blocking the flow of fluids through the gap between a vessel 12 and a beverage container 14, a seal 66 may form a secondary insulator between a beverage container 14 and the ambient air. This secondary insulator may be a closed off volume (e.g., an annular cylinder) of air located between an inner wall 54 of a body 30 and the sides of a beverage container 14.

Additionally, a seal 66 may prevent a thermal conductor 62 like water from exiting a system 10. That is, in certain embodiments, a whole system 10 may be picked up and tilted to pour the beverage from the beverage container 14. This may tend to cause a thermal conductor 62 in liquid form to congregate proximate a top aperture 36. Accordingly, a seal 66 may be included to prevent the thermal conductor from escaping or being served with the beverage.

In selected embodiments, a seal 66 may be incorporated into a top 28. Thus, tightening of a top 28 onto a body 30 may both secure a beverage container 14 within the vessel 12 and force a seal 66 against the beverage container 14 to seal the interface between the beverage container 14 and the vessel 12.

In certain embodiments, a seal 66 may be formed of a material that is different from the material forming a top 28. For example, a top 28 may be formed of a metal (e.g., steel, aluminum, or the like) or other substantially rigid material, while a seal 66 may be formed of a more compliant material such as an elastic polymer.

A seal 66a, 66b may extend into a slot 68 formed in a top 28 or otherwise mechanically engage the top 28. This may enable loads to be transferred between the top 28 and the seal 66a, 66b. In selected embodiments, a seal 66a may provide a centering chamfer 50a. In other embodiments, a seal 66b may comprise a bulb seal that may flex, compress, rebound, or the like more easily in order to seal against a wider variety of shapes, across larger and smaller interface gaps, etc. In still other embodiments, a seal 66c may comprise an O-ring that is urged by a shoulder 70 formed in a top 28 against a beverage container 14.

Figure 10:
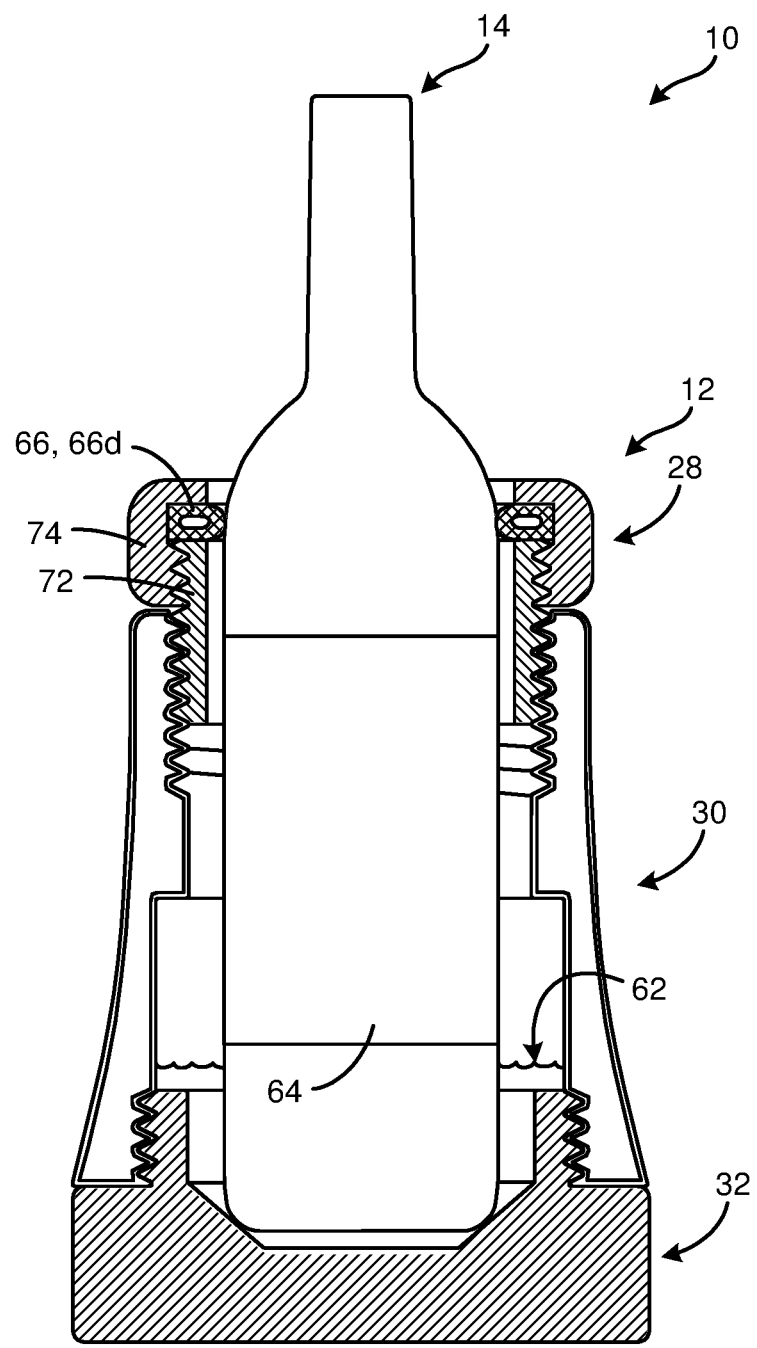
FIG. 10 is a cross-sectional view of an alternative embodiment of a vessel in accordance with the present invention with a beverage container that is not shown in cross-section contained therewithin.

Referring to FIG. 10, in selected embodiments, a top 28 may comprise multiple components 72, 74 that selectively move with respect to one another. Certain such relative movement may tend to compress a seal 66d. This compression may cause the seal 66d to deflect and extend toward a beverage container 14. Thus, by dialing up the compression on the seal 66d, the seal 66d may be advanced until it contacts the beverage container 14 with a desired sealing force. Conversely, by dialing back the compression on the seal 66d, the resiliency of the seal 66d may cause it to retract until the sealing action is broken and the beverage container 14 is free to be removed.

In certain embodiments, the multiple components 72, 74 of a top 28 may include an inner component 72 and an outer component 74, both of which are annular in shape. An inner component 72 may include a first engagement mechanism 40 suitable for engaging a second engagement mechanism 42 of a body 30. An outer component 74 may threadedly engage the inner component 72. A seal 66d may be place between the inner and outer components 72, 74. Thus, by adjusting the position of an inner component 72 with respect to the body 30 and the position of the outer component 74 with respect to the inner component 72, the compression applied to the seal 66d may be controlled and visual access to the first engagement mechanism 40 may be blocked. The compression force exerted by the inner and outer components 72, 74 may deform seal 66d such that continuous annular contact is made with a beverage container 14, thus creating an airtight seal. Also, a top 28 so configured may not need a shroud 52. The end result may be one vessel 12 that may serially receive, seal against, and release various beverage containers 14 in a range of sizes (e.g., beverage containers 14 that vary from each other in diameter by about 10 mm or less).

Figure 11:
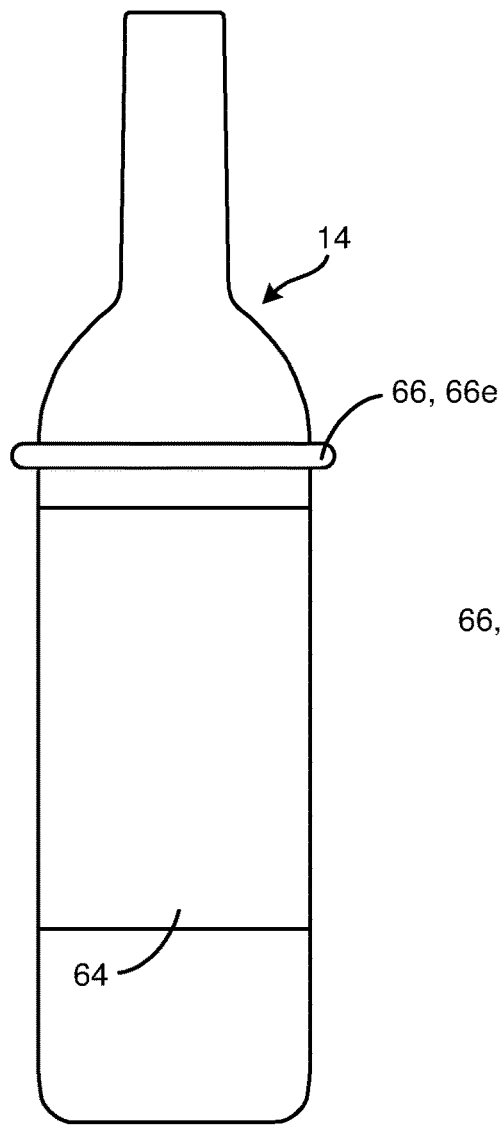
FIG. 11 is a side view of a beverage container with a seal applied thereto in accordance with the present invention.
Figure 12:
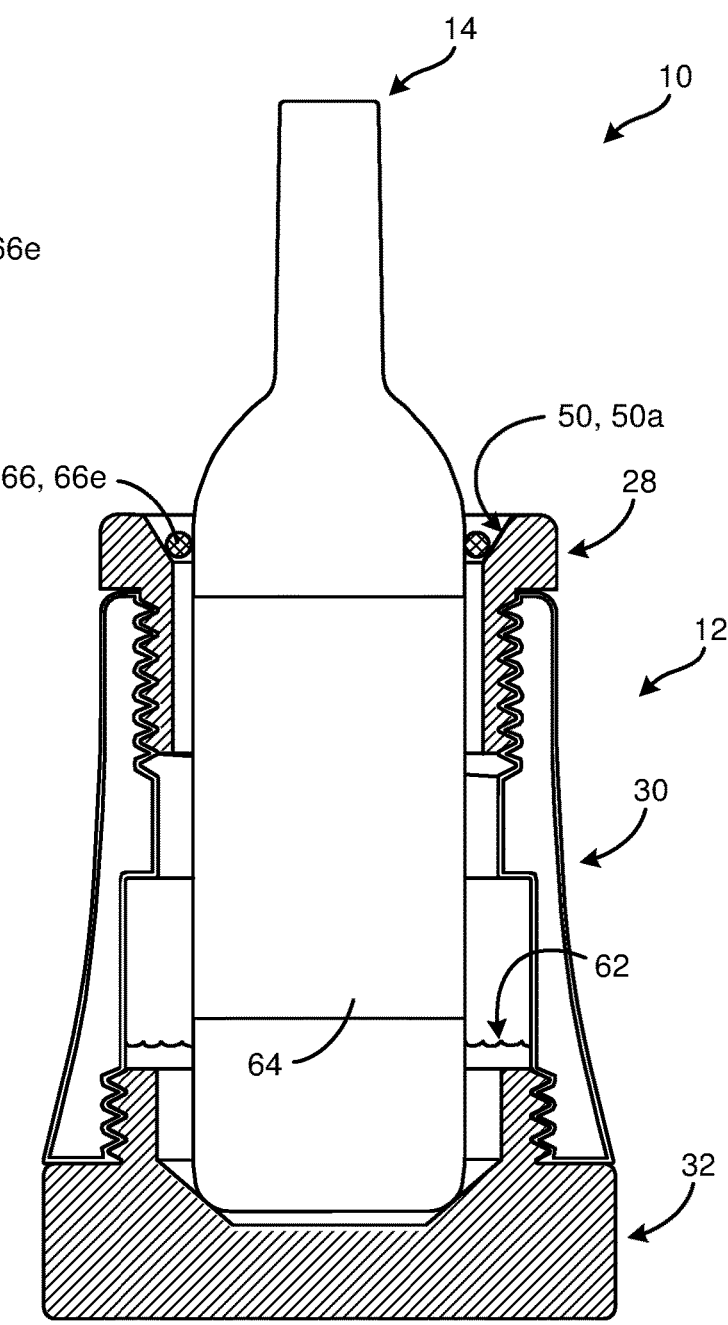
FIG. 12 is a cross-sectional view of another alternative embodiment of a vessel in accordance with the present invention with a beverage container that is not shown in cross-section contained therewithin.

Referring to FIGS. 11 and 12, in selected situations, a user may desire to serve a beverage after removing a beverage container 14 from a corresponding vessel 12. Accordingly, a system 10 may be configured to facilitate quick and easy transitions of a beverage container 14 into and out of a vessel 12. In certain embodiments, this may entail inverting a centering chamfer 50a associated with a top 28 and applying a seal 66e to a beverage container 14.

An inverted centering chamfer 50a may function as a funnel that guides a beverage container 14 into a vessel 12.

This may lower the time and attention needed to place a beverage container 14 within a vessel 12 or to return the beverage container 14 to the vessel 12. Additionally, an inverted centering chamfer 50a may enable gravity to aid in creating an effective seal between a top 28 and a beverage container 14. Thus, even when a beverage container 14 is being removed from a vessel 12 to serve the beverage, the beverage container 14 may spend most of the time within the vessel 12, which may enable the vessel 12 to efficiently operate in drift-reduction mode or the like.

In selected embodiments, a seal 66e may comprise an O-ring that extends snuggly around an upper portion of a beverage container 14. The seal 66e may be rolled onto the beverage container 14. An elastic nature of the seal 66e may enable it to stretch to snuggly fit various beverage containers 14 in a range of sizes (e.g., beverage containers 14 that vary from each other in diameter by about 10 mm or less).

The seal 66e may be positioned so that it will contact the inverted centering chamfer 50a of a top 28 slightly before the bottom of the beverage container 14 contacts a base 32 (e.g., a centering chamfer 50b of a base 32). Accordingly, gravity may tend to compress the seal 66e between the inverted centering chamfer 50a and the side of the beverage container 14. Thus, the seal 66e may create a secondary insulator comprising a closed off volume (e.g., an annular cylinder) of air located between an inner wall 54 of a body 30 and the sides of a beverage container 14. However, at any time, the sealing action of the seal 66e may be easily and quickly broken by simply lifting the beverage container 14 out of the vessel 12.

Figure 13:
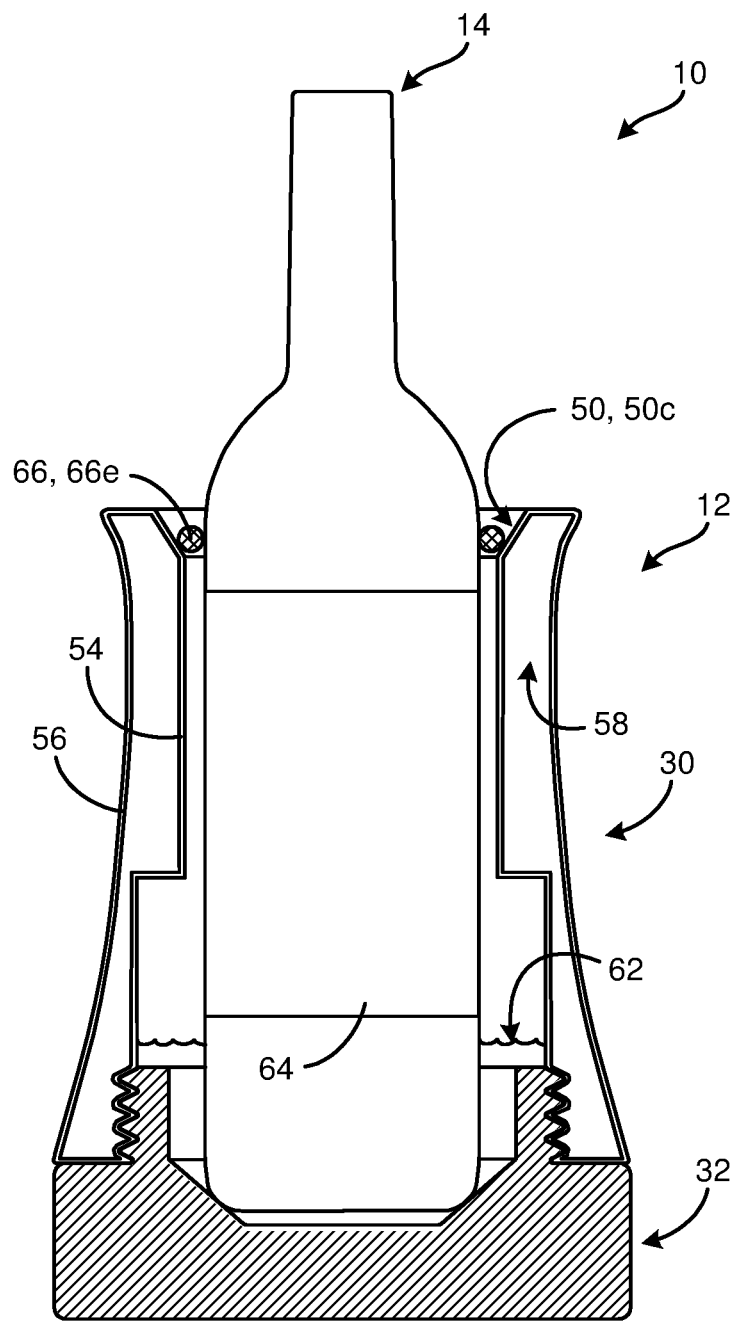
FIG. 13 is a cross-sectional view of another alternative embodiment of a vessel in accordance with the present invention with a beverage container that is not shown in cross-section contained therewithin.

Referring to FIG. 13, in certain embodiments, a top 28 may be omitted. For example, a top 28 may be omitted and a reversed centering chamfer 50c may be included as part of a body 30 (e.g., as part of an inner wall 54 of a body 30). Accordingly, as described hereinabove, a seal 66e may extend snuggly around an upper portion of a beverage container 14. The seal 66e may be positioned so that it will contact the inverted centering chamfer 50c of the body 30 slightly before the bottom of the beverage container 14 contacts a base 32 (e.g., a centering chamfer 50b of a base 32). Accordingly, gravity may tend to compress the seal 66e between the inverted centering chamfer 50c and the side of the beverage container 14.

Thus, the seal 66e may create a secondary insulator comprising a closed off volume (e.g., an annular cylinder) of air located between an inner wall 54 of a body 30 and the sides of a beverage container 14. However, at any time, the sealing action of the seal 66e may be easily and quickly broken by simply lifting the beverage container 14 out of the vessel 12.

Figure 14:
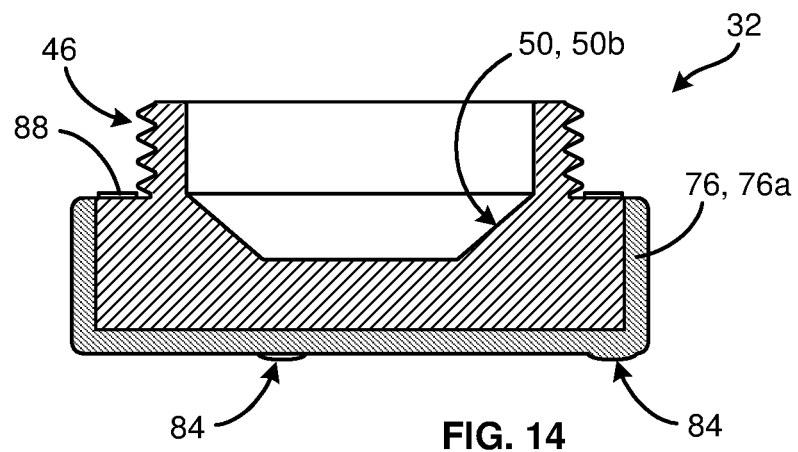
FIG. 14 is a cross-sectional view of an alternative embodiment of a base of a vessel in accordance with the present invention.
Figure 15:
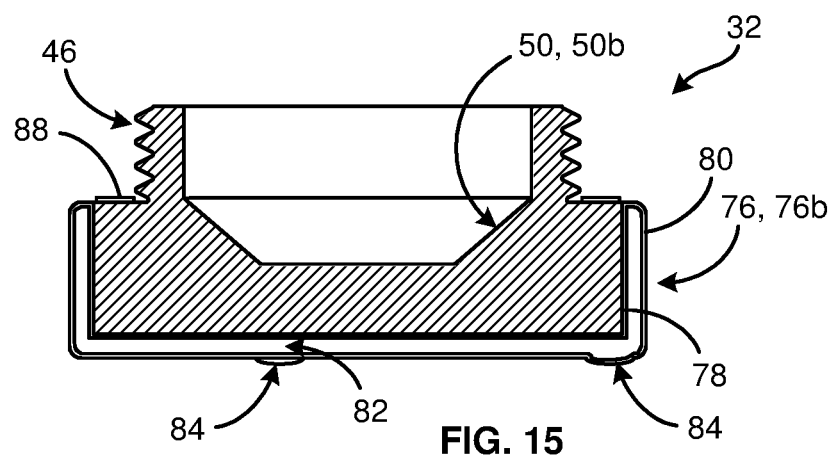
FIG. 15 is a cross-sectional view of another alternative embodiment of a base of a vessel in accordance with the present invention.
Figure 16:
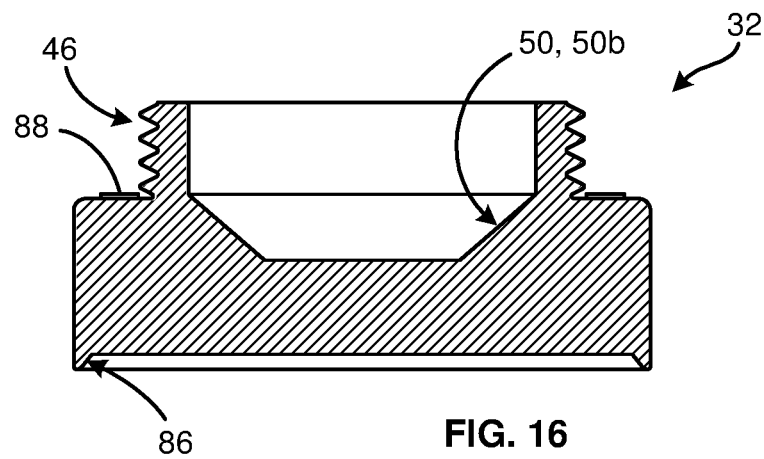
FIG. 16 is a cross-sectional view of another alternative embodiment of a base of a vessel in accordance with the present invention.

Referring to FIGS. 14-16, in selected embodiments, a base 32 may be configured to limit or reduce the flow of heat between itself and an environment external to the vessel 12. This may be accomplished without limiting or reducing the flow of heat between a base 32 and an environment internal to the vessel 12. For example, all or substantially all exterior portions of a base 32 may comprise an outer layer 76 of thermally insulative material.

In selected embodiments, such an outer layer 76a of thermally insulative material may comprise a material having a relatively lower heat transfer coefficient (e.g., G10 or the like). In other embodiments, such a layer 76b may comprise inner and outer walls 78, 80 with a space 82 (e.g., an evacuated space) therebetween. Thus, an outer layer 76b may vacuum insulate a base 32.

In certain embodiments, a base 32 may include a plurality of feet 84 (e.g., three feet) that space a bottom of the base 32 from any supporting surface (e.g., table top) therebelow. Such spacing may lower a conductive flow of heat between the base 32 and the supporting surface. Alternatively, a base 32 may include a bottom lip 86. A lip 86 may also space a bottom of the base 32 from any supporting surface (e.g., table top) therebelow and, thereby, reduce a conductive flow of heat therebetween. A bottom lip 86 may also improve the grip of a user holding the vessel 12, which may be important when beverages are being poured from an assembled system 10 (as opposed to pouring from a beverage container that has been removed from a vessel 12). Alternatively or in addition thereto, a bottom lip 86 may be formed of an elastomeric material to improve the grip of a base 32 on the surface of a table. In certain embodiments or situations, this grip may aid in effecting or releasing an engagement between a base 32 and a body 30. For example, by first placing the base 32 on a table and then placing the body 30 onto the base 32 and pressing the body 30 down while rotating, it may be easier to mesh and/or fully engage the corresponding engagement mechanisms 46, 48 because the grip of a lip 86 may hold the base 32 in place (i.e., so the user does not have to and can just focus on aligning and working the body 30).

In selected embodiments, a base 32 may include a seal 88 or gripping material 88 positioned so as to contact a bottom portion 44 of a body 30 when the base 32 is applied thereto. The seal 88 or gripping material 88 may limit the flow of fluids (e.g., a thermal conductor 62) through the interface between the base 32 and body 30. It may also resist rotation of the base 32 with respect to the body 30 when those two components are connected together. Thus, the seal 88 or gripping material 88 may lower the risk of an inadvertent separation of a base 32 from a body 30.

Figure 17:
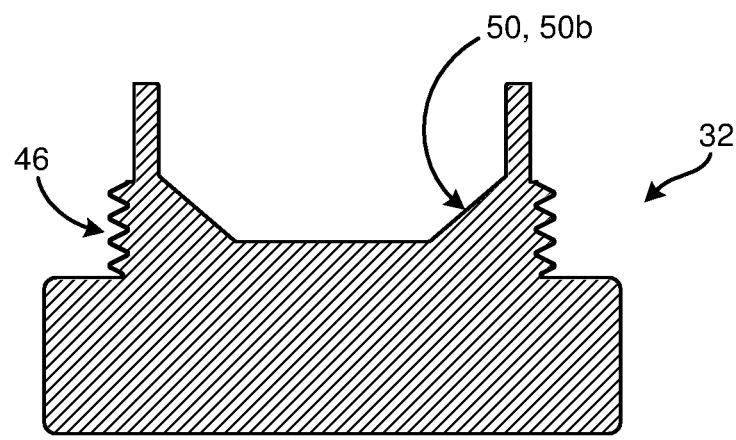
FIG. 17 is a cross-sectional view of another alternative embodiment of a base of a vessel in accordance with the present invention.

Referring to FIG. 17, in certain embodiments, a base 32 may be selected, shaped, and/or sized to provide a desired depth of a cavity 34. For example, by raising or lowering a location of a centering chamfer 50b of a base 32, the depth of a cavity 34 may be, respectively, shortened or increased. Thus, different bases 32 may be incorporated into a vessel 12 depending on how deep the cavity 34 needs to be to accommodate a particular beverage container 14.

In the illustrated embodiment, the centering chamfer 50b is higher than in other illustrations herein. When such a base 32 is incorporated within a vessel 12 in accordance with the present invention, it may decrease the depth of the cavity 34 and render the vessel 12 suitable for receiving a beverage container 14 with a shorter body section (e.g., a Burgundy-style bottle or the like) therewithin. In selected embodiments, the increased mass of such a base 32 may provide sufficient stability despite the fact that the beverage container 14 may ride higher within the vessel 12.

Figure 18:
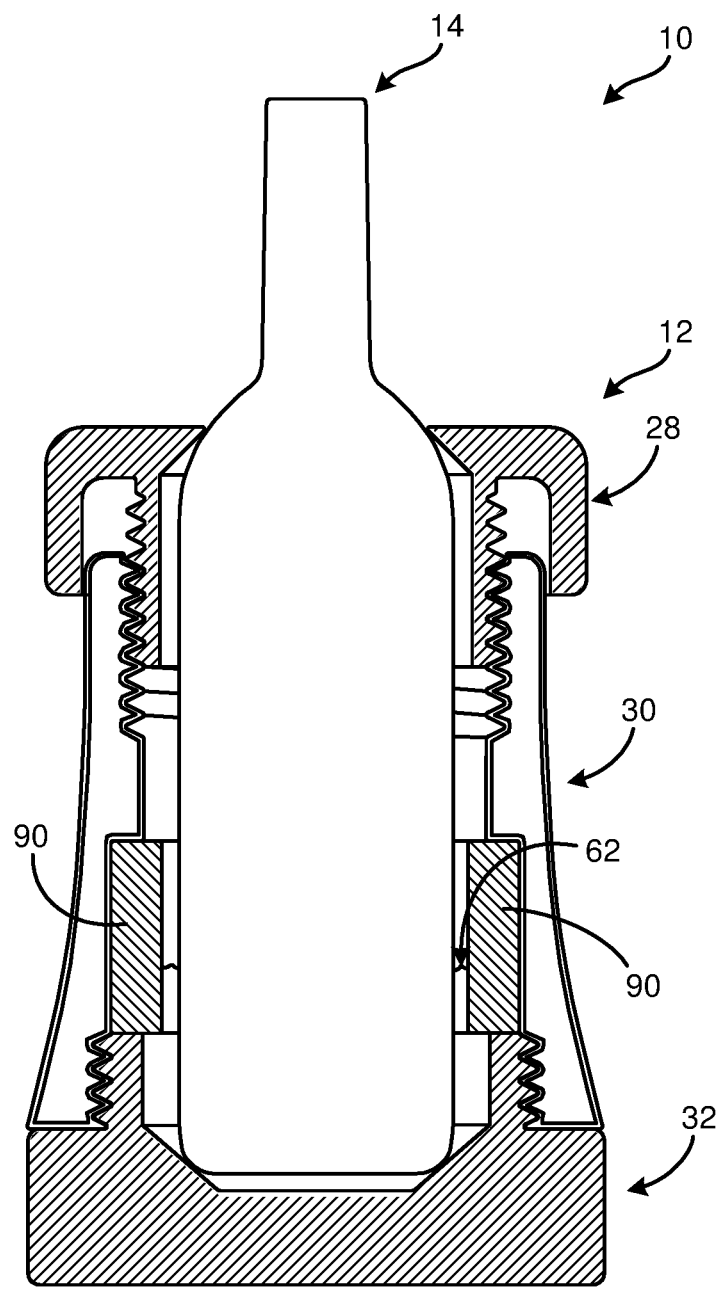
FIG. 18 is a cross-sectional view of another alternative embodiment of a vessel in accordance with the present invention with a beverage container that is not shown in cross-section contained therewithin.

Referring to FIG. 18, in certain embodiments, additional material 90 may be secured or contained within a vessel 12 (e.g., within a cavity 34 of a vessel 12, but exterior to the beverage container 14). The amount and initial temperature of the additional material 90 may be selected, tuned, or otherwise factored in when the equilibrium temperature is mathematically or empirically projected or determined. Accordingly, the amount and initial temperature of the additional material 90 may be another variable that may be controlled in order to make an equilibrium temperature match a particular optimal serving temperature.

Alternatively, or in addition thereto, the additional material 90 may provide some control over a point of balance of a system 10 in accordance with the present invention. When pouring out of a system 10, the axial distribution of weight within a vessel 12 may affect how the system 10 feels, moves, pivots, etc. Accordingly, by selecting the mass of the additional material 90 and the axial location of the additional material 90 within the vessel 12, a user may tune or move the point of balance as desired.

In selected embodiments, additional material 90 secured or contained within a vessel 12 may be solid. For example, the additional material 90 may comprise an annular ring of ice, metal, or the like. Alternatively, the additional material 90 may be or comprise a liquid or gel material. For example, the additional material 90 may comprise or be an annular gel pack (e.g., an annular gel pack stored in a freezer before being inserted within a vessel 12). In certain embodiments, the additional material 90 (e.g., an annular gel pack) may be sized and shaped to contact the sides of a beverage container 14 when the beverage container 14 is inserted within the cavity 34 of a vessel 12.

In selected embodiments, the additional material 90 may be secured in place to prevent unwanted motion of the additional material 90 within the vessel 12. In certain embodiments, additional material 90 in the shape of an annular ring may be clamped, held, or loosely held between a base 32 and a shoulder 60 formed in an interior surface of a body 30.

Figure 19:
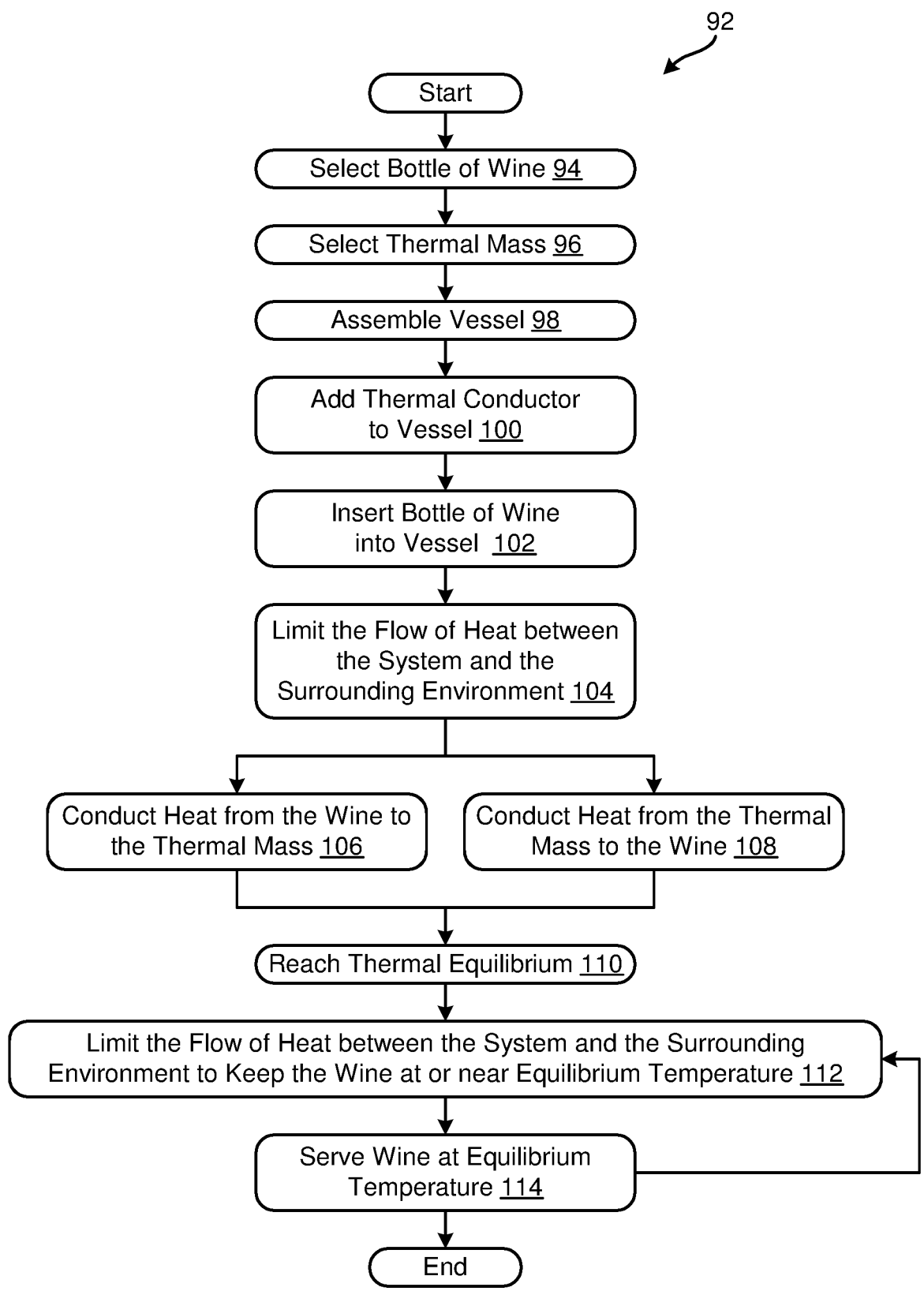
FIG. 19 is a schematic block diagram of one embodiment of a method in accordance with the present invention.
Figure 20:
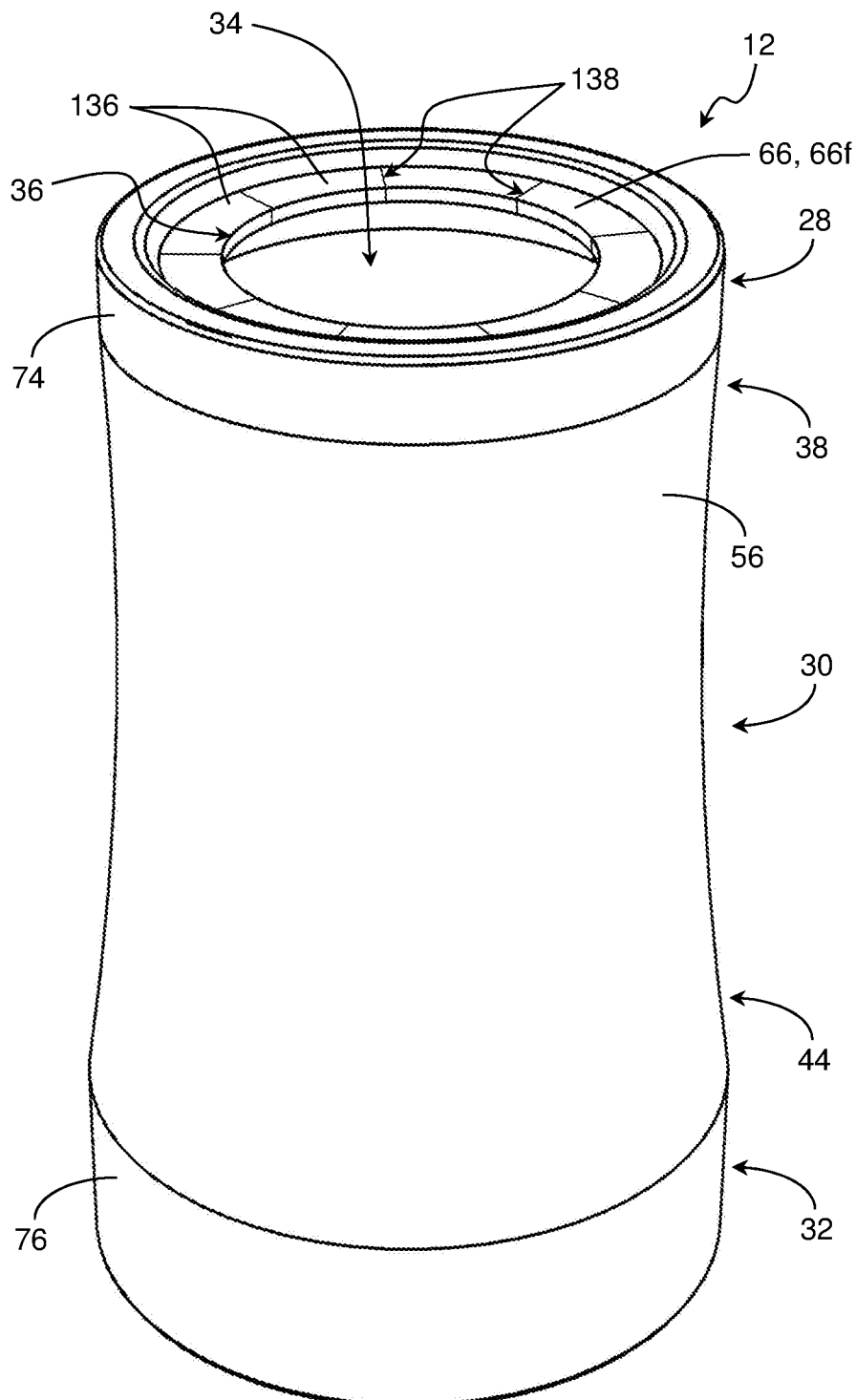
FIG. 20 is a perspective view of an alternative embodiment of a vessel in accordance with the present invention.
Figure 21:
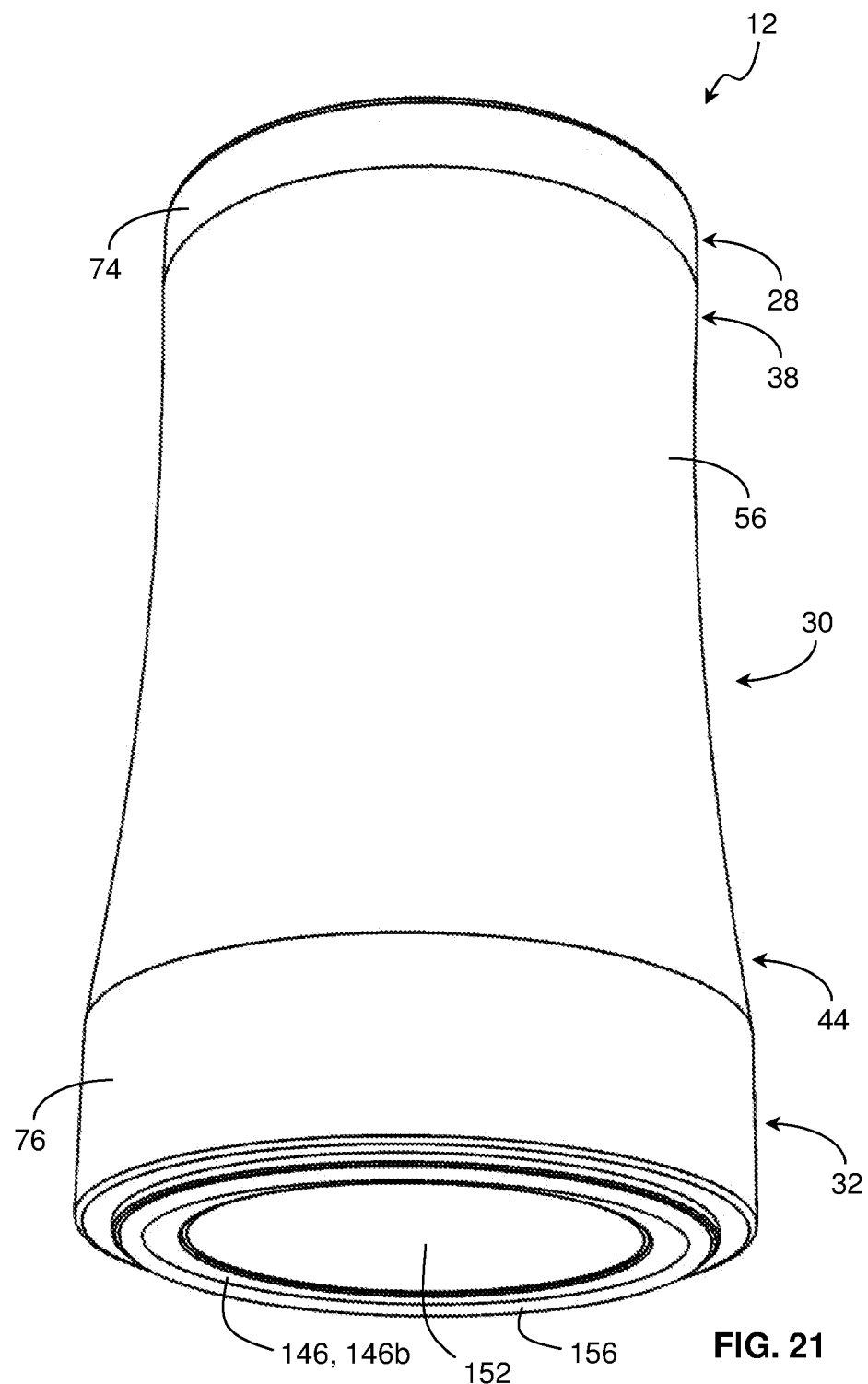
FIG. 21 is another perspective view of the vessel of FIG. 20.
Figure 22:
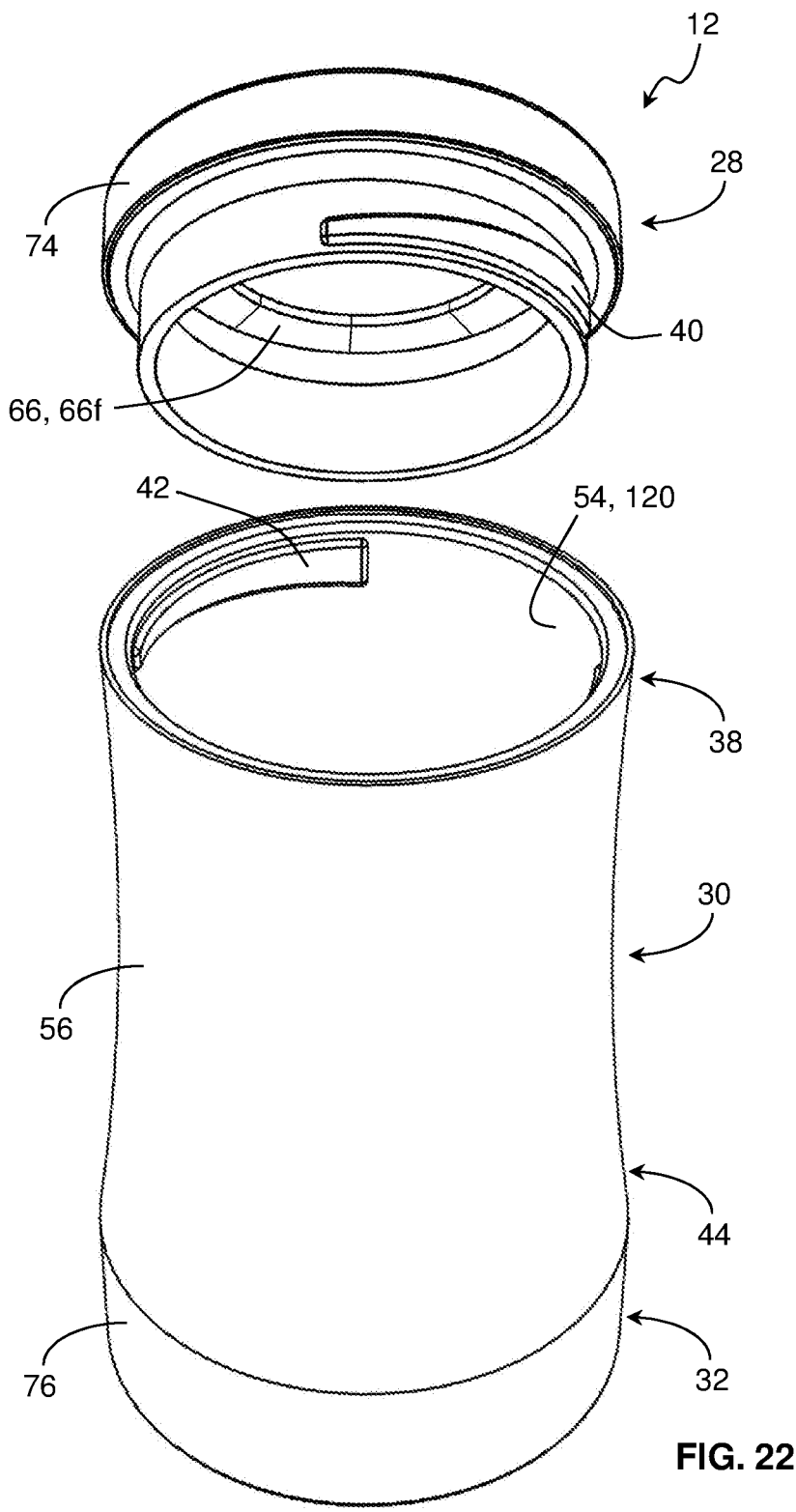
FIG. 22 is a perspective view of the vessel of FIG. 20 with the top removed.
Figure 23:
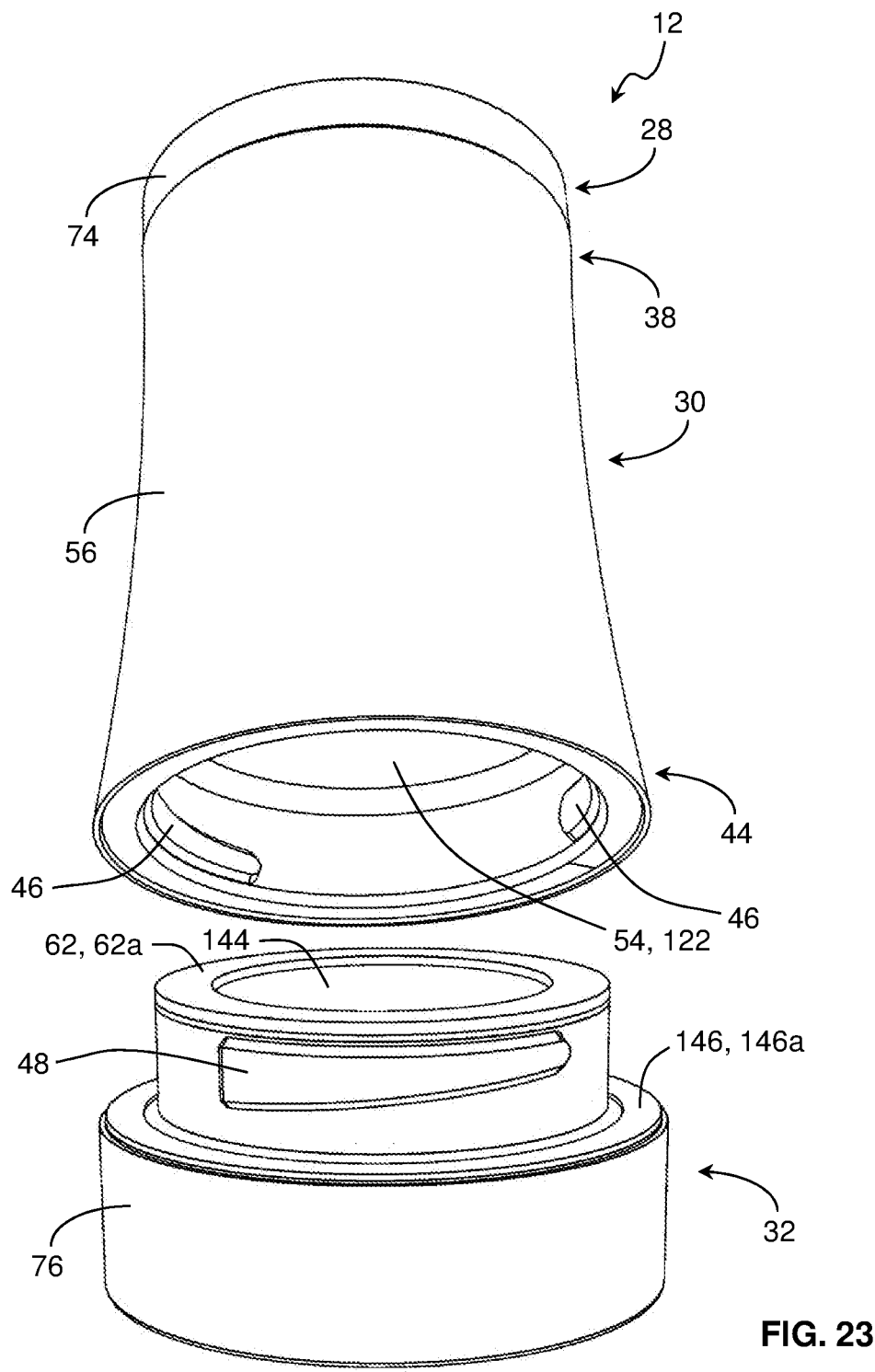
FIG. 23 is a perspective view of the vessel of FIG. 20 with the base removed.
Figure 24:
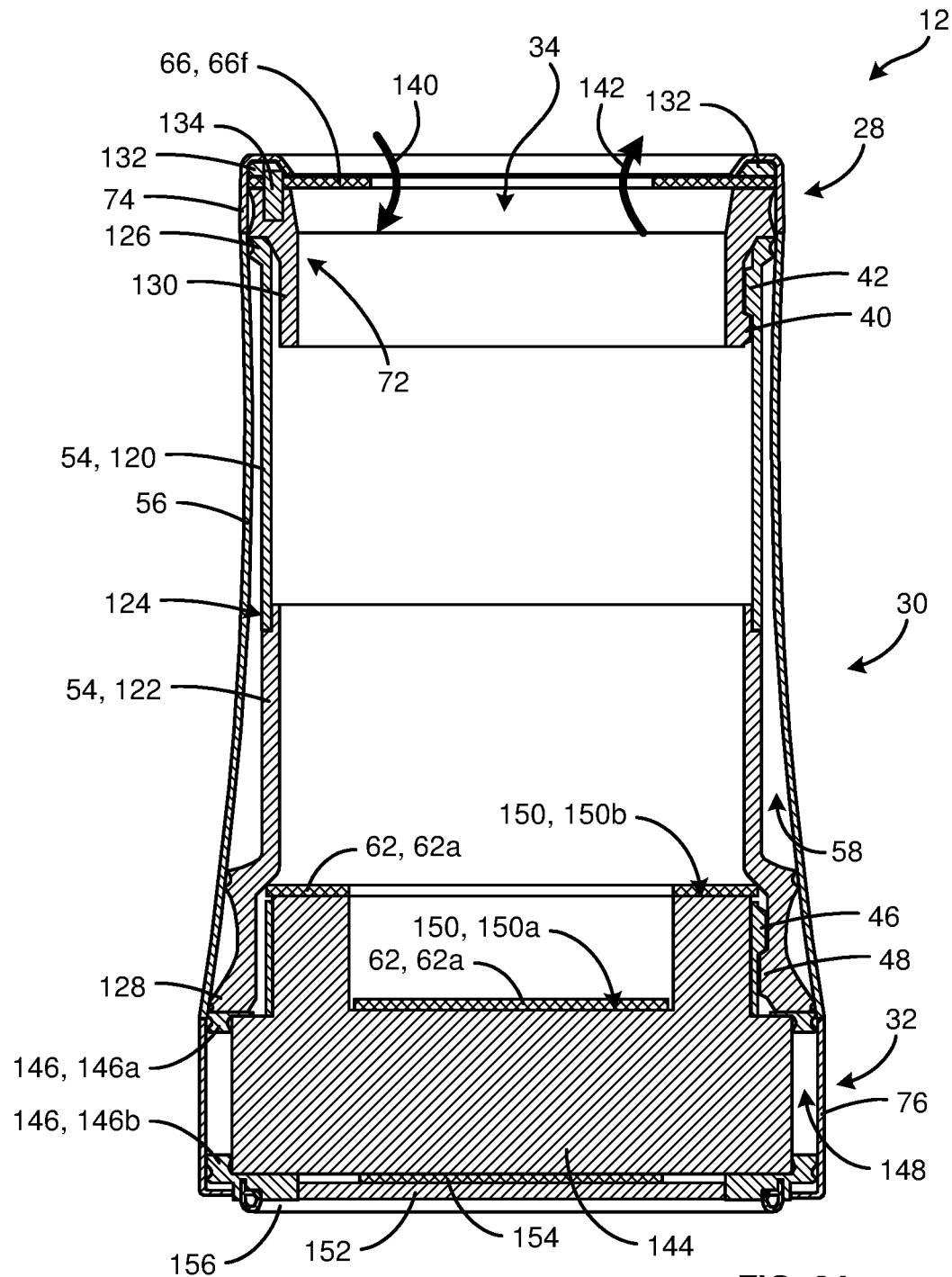
FIG. 24 is a cross-sectional view of the vessel of FIG. 20.

Referring to FIG. 19, in certain embodiments, a method 92 in accordance with the present invention may begin with the selection 94 of a bottle of wine. The bottle of wine may have a storage temperature and an optimal serving temperature. Usually those two temperatures will not be the same. Accordingly, some heat transfer may be needed to move the wine within the bottle from the storage temperature to the optimal serving temperature. To effect that heat transfer, a user may select 96 an appropriate thermal mass.

The thermal mass may be a base 32 having a particular mass and temperature, a quantity of thermal conductor 62 at a particular temperature, a quantity of additional material 90 at a particular temperature, or the like or a combination or sub-combination thereof. Selecting 96 an appropriate thermal mass may be like selecting the ingredients for cooking a particular dish. However, the user need not solve the heat transfer problem himself or herself. The work can already be done and several relatively simple preparation processes may be communicated to users of systems 10 in accordance with the present invention.

For example, it may be determined that a base 32 of a particular, standard mass stored in a refrigerator, when combined with a thermal conductor 62 comprising a quarter cup of room temperature water, is sufficient to lower the temperature of a bottle of red wine from room temperature to about 65° F. Accordingly, if the wine selected 94 is a red wine, the user need only retrieve the base 32 from the refrigerator and get a quarter cup of room temperature water. Other standard protocols may be followed for other types of wine.

For example, it may be determined that a base 32 of a particular, standard mass stored at room temperature, when combined with a thermal conductor 62 comprising a quarter cup of room temperature water, is sufficient to raise the temperature of a white wine from 35° F. temperature to about 50° F. Accordingly, if the wine selected 94 is a white wine, the user need only retrieve the base 32 from the shelf and get a quarter cup of room temperature water.

In general, the "recipes" for transitioning a particular beverage to a particular temperature may involve standard items, standard temperatures, and standard quantities. For example, most kitchens provide ready access to room temperature, refrigerator, and freezer storage. Thus, the recipes may involve obtaining a base 32 or additional material 90 stored in one of those three places. Similarly, a quarter cup (or some other readily measured amount) of water at wide range of temperatures can be obtained from almost any kitchen sink. Thus, water that is "cool," "room temperature," "lukewarm" or the like may easily be obtained.

With an appropriate thermal mass in hand, the user is ready to assemble 98 (or at least partially assemble) the vessel 12. This may include attaching a selected base 32 to a standard body 30. The thermal conductor 62 (e.g., a particular quantity of water) may then be added 100 to the vessel 12 (e.g., poured into the cavity 34 of the vessel 12). The bottle of wine that was selected 94 may then be placed 102 or inserted 102 within the vessel 12. If necessary or desired, a top 28 may then be applied or adjusted to secure the bottle within the vessel 12.

With the bottle within the vessel 12, the vessel 12 may limit 104 the flow of heat between the system 10 (e.g., the cavity 34 and the contents thereof) and the surrounding environment. However, within the vessel 12, heat may be flowing 106 from the wine to the thermal mass (e.g., the base 32) or flowing 108 from the thermal mass (e.g., the base 32) to the wine via the thermal conductor 62.

Within a period of time 22, the contents of the cavity 34 may reach 110 a thermal equilibrium with the base 32. Accordingly, the flow of heat therebetween may slow and eventually stop. However, the vessel 12 may continue to limit 112 the flow of heat between the system 10 (e.g., the cavity 34 and the contents thereof) and the surrounding environment. This may keep the wine at or near an equilibrium temperature. Accordingly, the wine may be served 114 at will at the equilibrium temperature. Since the equilibrium temperature may be tuned to match an optimal serving temperature, the wine may be served initially and continuously at or very near the optimal serving temperature.

Referring to FIGS. 20-24, in selected embodiments, a body 30 may be formed of multiple pieces or components. This may facilitate manufacturing or assembly of a body 30. For example, a body 30 may include an outer wall 56, a top portion 120 of an inner wall 54, and a bottom portion 122 of an inner wall 54 that are separate components that join (e.g., are bonded, welded, friction welded, etc.) to form a body 30. In certain embodiments, the multiple pieces or components may be formed of different materials. For example, an outer wall 56 may be formed of metal (e.g., anodized aluminum), while a top portion 120 and a bottom portion 122 may be formed of polymeric material.

Once assembled, a top portion 120 may be joined to a bottom portion 122 (e.g., at a lap joint 124), a top of a top portion 120 may be joined to a top of an outer wall 56, and a bottom of a bottom portion 122 may be joined to a bottom of the outer wall 56. In selected embodiments, a top of a top portion 120 may comprise a shoulder 126 that extends radially outward to engage or abut an inner surface of a top of an outer wall 56. Such a shoulder 126 may provide a bonding surface enabling an adhesive (e.g., an epoxy) to connect the top portion 120 to the top of the outer wall 56.

Similarly, a bottom of a bottom portion 122 may comprise a shoulder 128 that extends radially outward to engage or abut an inner surface of a bottom of an outer wall 56. Such a shoulder 128 may provide a bonding surface enabling an adhesive (e.g., an epoxy) to connect the bottom portion 122 to the bottom of the outer wall 56. In certain embodiments, the shoulders 126, 128 may provide self-centering and tensioning of an inner wall 54 with respect to an outer wall 56.

In selected embodiments, a shoulder 128 may be a monolithic extension of a bottom portion 122. Alternatively, to accommodate manufacturing tolerances, a shoulder 128 may be separable from the rest of a bottom portion 122. Thus, the relative position of a shoulder 128 may be adjusted (e.g., adjusted using a threaded interface between a shoulder 128 and the rest of a bottom portion 122) before a final securement, bonding, or the like of the shoulder 128 with respect to the rest of the bottom portion 122 and the outer wall 56.

In certain embodiments, the multiple pieces or components 72, 74 of a top 28 may be formed of different materials. For example, an outer component 74 may be formed of metal (e.g., anodized aluminum), while an inner component 72 may be formed of a polymeric material. In selected embodiments, an inner component 72 may comprise multiple elements.

For example, an inner component 72 may comprise a main portion 130, top portion 132, and multiple pegs 134 or pins 134. A main portion 130 may form a foundation for the other components 132, 134 of an inner component 72. In selected embodiments, a main portion 130 may include a first engagement mechanism 40. A top portion 132 may be located above a main portion 130. In certain embodiments, a seal 66 (e.g., a seal 66f configured as a gasket) may be positioned between a top portion 132 and a main portion 130 and extend radial inward therefrom to define a size or diameter of an aperture 36 of a top 28. Multiple pegs 134 or pins 134 may extend from a main portion 130 upward through a seal 66 and into a top portion 132. Accordingly, the pegs 134 or pins 134 may hold the seal 66 in place. The pegs 134 or pins 134 may be bonded to one or more of a main portion 130, top portion 132, and seal 66.

In selected embodiments, a seal 66 may comprise or be configured as a relatively thin, circular gasket formed of a suitable material such as polyurethane, butyl rubber, or other elastomer or elastomeric material. A seal 66 may be segmented (e.g., include a plurality of flexible tabs 136 forming an interior circumference thereof). Slits 138 (e.g., radially extending slits 138) in the material forming the seal 66 may define the boundaries of the various tabs 136. Thus, a seal 66 may define an adjustable rather than a fixed aperture 36.

That is, a beverage container 14 may have a maximum diameter that is greater than a neutral, undeflected diameter of a seal 66. According, as the beverage container 14 is inserted through an aperture 36 defined by the seal 66 and into a cavity 34 of a vessel 12, the tabs 136 of a seal 66 may deflect 140 inward. This deflection 140 may increase the effective size or diameter of the aperture 36.

Once a portion of the beverage container 14 having the maximum diameter has moved passed a seal 66, the tabs 136 thereof may, through their inherent resiliency, return to a position closer to their neutral, undeflected position. In selected embodiments, a seal 66 may be sized and positioned so that the tabs 136 thereof are permitted by the shape of the beverage container 14 to return to their neutral, undeflected position just as the beverage container 14 comes to rest on the bottom of the cavity 34 (e.g., comes to rest on the desired and appropriate surface of a base 32). This may enable a seal 66 to effectively close off from ambient influence the air gap between an inner wall 54 of a vessel 12 and a beverage container 14. This may improve the thermal performance of a system 10 in accordance with the present invention.

However, since beverage containers 14 vary in size and one seal 66 may not perfectly fit all beverage containers 14, the flexibility and resiliency of the tabs 136 may enable a seal 66 to mostly close off the air gap even when the fit is not perfect. Thus, a seal 66 may improve the thermal performance of a vessel 12 even when the vessel 12 is used in combination with a wide variety of beverage containers 14 (e.g., a wide variety of wine bottles).

As a beverage container 14 is removed from a cavity 34 within a vessel 12, the maximum diameter of the container 14 may cause the tabs 136 of a seal 66 to deflect 142 outward. Like the inward deflection 140, this outward deflection 142 may also increase the effective size or diameter of the aperture 36. A seal 66 may have sufficient flexibility and strength to enable the tabs 136 thereof to repeatedly "break over center" (e.g., transition from deflecting 140 inwardly to deflecting 142 outwardly or vice versa) without binding or otherwise inhibiting the insertion and/or extraction of beverage containers 14 (e.g., even beverage containers 14 on the wider end of the spectrum). Accordingly, a seal 66 having tabs 136 may improve the thermal performance of a vessel 12 in accordance with the present invention without requiring any adjustment or fitting and without presenting any obstacle to the insertion or extraction of the beverage container 14.

In certain embodiments, a base 32 may comprise a core 144 and an outer layer 76. A core 144 may be a heat sink or source, while an outer layer 76 may limit heat transfer between a core 144 and a surrounding environment. The material and size of a core 144 may be selected or tuned to provide a desired thermal performance of a system 10 in accordance with the present invention.

In selected embodiments, one or more interface mechanisms 146 may interface between a core 144 and an outer layer 76. For example, a top interface mechanism 146a may interface between a core 144 and an upper portion of an outer layer 76 and a bottom interface mechanism 146b may interface between a core 144 and a lower portion of an outer layer 76. A core 144 may be bonded to an outer layer 76 at the interface mechanisms 146.

In selected embodiments, a space 148 may be formed between a core 144 and an outer layer 76 at certain locations. In certain embodiments, this space 148 may be an air gap or vacuum (e.g., a partial vacuum). In other embodiments, the space 148 may be filled with thermal insulation such as foam (e.g., spray foam introduced through an aperture in a top interface mechanism 146a). Accordingly, the space 148 may improve the thermal isolation of the core 144 from a surrounding environment.

A thermal conductor 62 may interface between one or more top surfaces 150 of a core 144 and a beverage container 14. In selected embodiments, a thermal conductor 62 may comprise a piece (e.g., a disk, ring, or the like) of thermal foam 62a. The weight of a beverage container 14 and the contents thereof may urge the beverage container 14 downward against the thermal foam 62a. This force may cause the thermal foam 62a to conform to the contours of the bottom of the beverage container 14 and provide a suitable thermal conduction path between a corresponding core 144 and the beverage container 14.

In embodiments wherein a thermal conductor 62 comprises thermal foam 62a or the like, a method 92 of use need not include the step of adding 100 a thermal conductor 62 to the vessel 12. That is, the thermal conductor 62 may already form part of the thermal mass that is selected 96 or included as part of the vessel 12.

In selected embodiments, a thermal conductor 62 may comprise low durometer thermal foam. The thermal foam 62a may be flat. Alternatively, a core 144 (e.g., a top surface 150 of a core 144) may be formed to include a punt plug (e.g., a circular indentation), while a thermal conductor 62 may comprise a circle of thermal foam with a diameter greater than the punt plug to which it is attached. This may allows for a "skirt effect" wherein the plug/foam is inserted or pushed into the punt, which may cause the foam to conform to the taper of the punt and contact a greater portion of a corresponding beverage container 14. This skirt effect may increase the contact surface area.

In certain embodiments, a core 144 may include a central, circular, top surface 150a and an annular, outer, top surface 150b. The two surfaces 150a, 150b may be at different heights to accommodate or fit different types of beverage containers 14. For example, a central, circular, top surface 150a (and a disk of a thermal conductor 62a corresponding thereto) may be sized to support the base of a Bordeaux-style wine bottle thereon, while a higher, annular, outer, top surface 150b (and an annulus of a thermal conductor 62b corresponding thereto) may be sized to support and contact the base of a Burgundy-style wine bottle. This may prevent Burgundy-style wine bottles from sitting too low and, thereby, leaving an opening between a seal 66 (e.g., gasket) and the bottle.

Thus, the difference in height between the two top surfaces 150a, 150b may be selected so that both types of bottles have, at the location of a seal 66, a diameter substantially matching the diameter of the aperture 36 in the seal 66 (e.g., substantially matching the neutral, undeflected, inner diameter of a seal 66). In selected embodiments, a seal 66 may be sized to fit or just contact a bottle shoulder having an outer diameter of about 75 mm and a base 32 may position the corresponding bottle such that the height of the bottle's 75 mm outer diameter shoulder is at or near the height of the seal 66.

In selected embodiments, a base 32 may include no heat sink or source component (e.g., no core 144). When such a base 32 is used, a system 10 may operate strictly in drift-reduction mode. In certain embodiments, such a base 32 may include a stepped shoulder, centering chamfer 50, multiple top surfaces 150a, 150b, or the like to keep each of the most common bottle types (e.g., Burgundy, Bordeaux, etc.) at a desired height within the vessel 12. In certain embodiments, such a base 32 may be used on a body 30 as a place holder, display only item, or the like while a full featured base 32 (e.g., a base 32 comprising a core 144) is stored in a refrigerated space so as to be ready for its next use.

In certain embodiments, a base 32 may include colored highlights. Different colors may correspond to different functionality for the base 32. For example, one color (e.g., red) may correspond to bases 32 that are to be stored at room temperature, while another color (e.g., blue) may correspond to bases 32 that are to be stored in the freezer.

In certain embodiments, a floor 152 or partial floor 152 may form a bottom portion of an outer layer 76. A floor 152 may be positioned below a core 144. An air gap or other space may separate a floor 152 from a core 144.

In certain embodiments, a floor 152 of a base 32 may be or include an engraved metal disk (e.g., laser engraved stainless steel disk). The disk may have written thereon (e.g., engraved therein) instructions for using a system 10 in a particular configuration that corresponds to the particular base 32 at issue. In selected embodiments, this disk may have adhesive foam 154 on the back thereof to support securement to a core 144. This may create the illusion that the disk is an integral part of the core 144.

In certain embodiments, a floor 152 may be circumnavigated by a stepped groove containing a length of flanged rubber tube 156 (e.g., an automotive trim protector having a P-shaped cross-sectional profile). For example, a bottom interface mechanism 146b may have a stepped groove formed therein and a rubber tube 156 may be placed within the stepped groove. A rubber tube 156 may be held in place with a combination of friction from the stepped groove and adhesive. A rubber tube 156 may also have the benefit of creating another air gap on the bottom of the base 32, a non-slip engagement with a supporting surface (e.g., table top), a non-scratch engagement with a supporting surface, or the like.

In selected embodiments, an outer layer 76 may be formed of any suitable material. The material of an outer layer 76 may be selected to provide a desired look or aesthetic. In certain embodiments, an outer layer 76 may be formed of metal that is bonded to one or more interface mechanisms 146 formed of polymeric material. In selected embodiments, an outer layer 76 may be or comprise anodized aluminum, chrome, brushed nickel, stainless steel, bronze, brass, or the like.

Alternatively, or in addition thereto, an outer layer 76 of a base 32 may include a groove providing a location for decorative banding to encircle a base 32. Accordingly, a groove may be filled with leather, fabric, metal, carbon fiber, or the like to encourage personality and to emphasize or take advantage of the modularity of systems 10 in accordance with the present invention.

Figure 25:
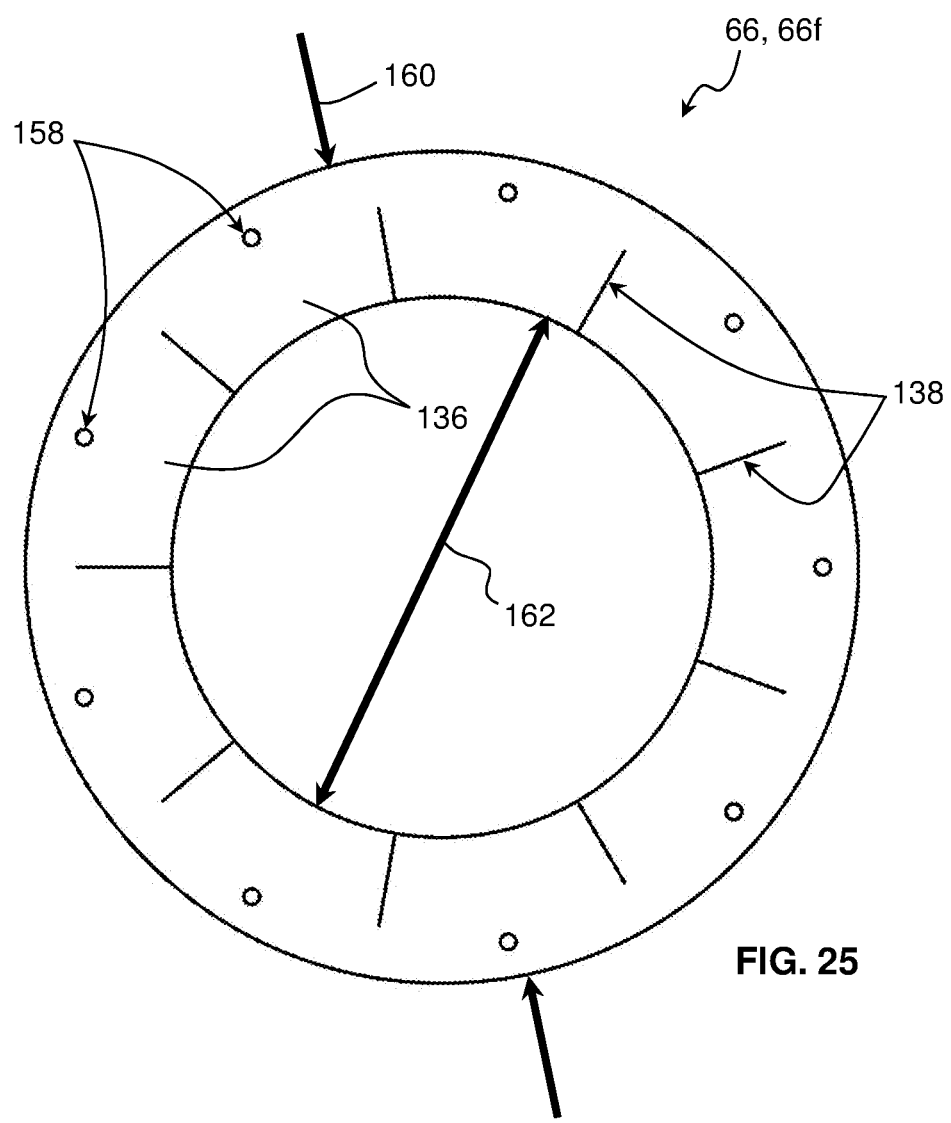
FIG. 25 is a top view of a seal of the vessel of FIG. 20.

Referring to FIG. 25, a seal 66 in accordance with the present invention may have any suitable number of tabs 136. In selected embodiments, a seal 66 may have a number of tabs 136 in a range from about eight to about twelve. A seal 66 having nine tabs 136 has been found to function well in systems 10 in accordance with the present invention.

A seal 66 may include a plurality of apertures 158 that enable one or more pegs 134 or pins 134 to extend therethrough. In certain embodiments, a number of apertures 158 may match a number of tabs 136. Accordingly, one aperture 158 may correspond to (e.g., be placed centrally with respect to) each tab 136.

In selected embodiments, a seal 66 (e.g., a seal 66 configured as a gasket) may have a thickness of about 1 mm to about 6 mm, an outer diameter 160 of about 95 mm to about 135 mm, and an inner diameter 162 of about 65 mm to about 85 mm. A seal 66 may be placed about 160 mm to about 200 mm above a central, circular, top surface 150a and about 130 mm to about 170 mm above an annular, outer, top surface 150b.

Figure 26:
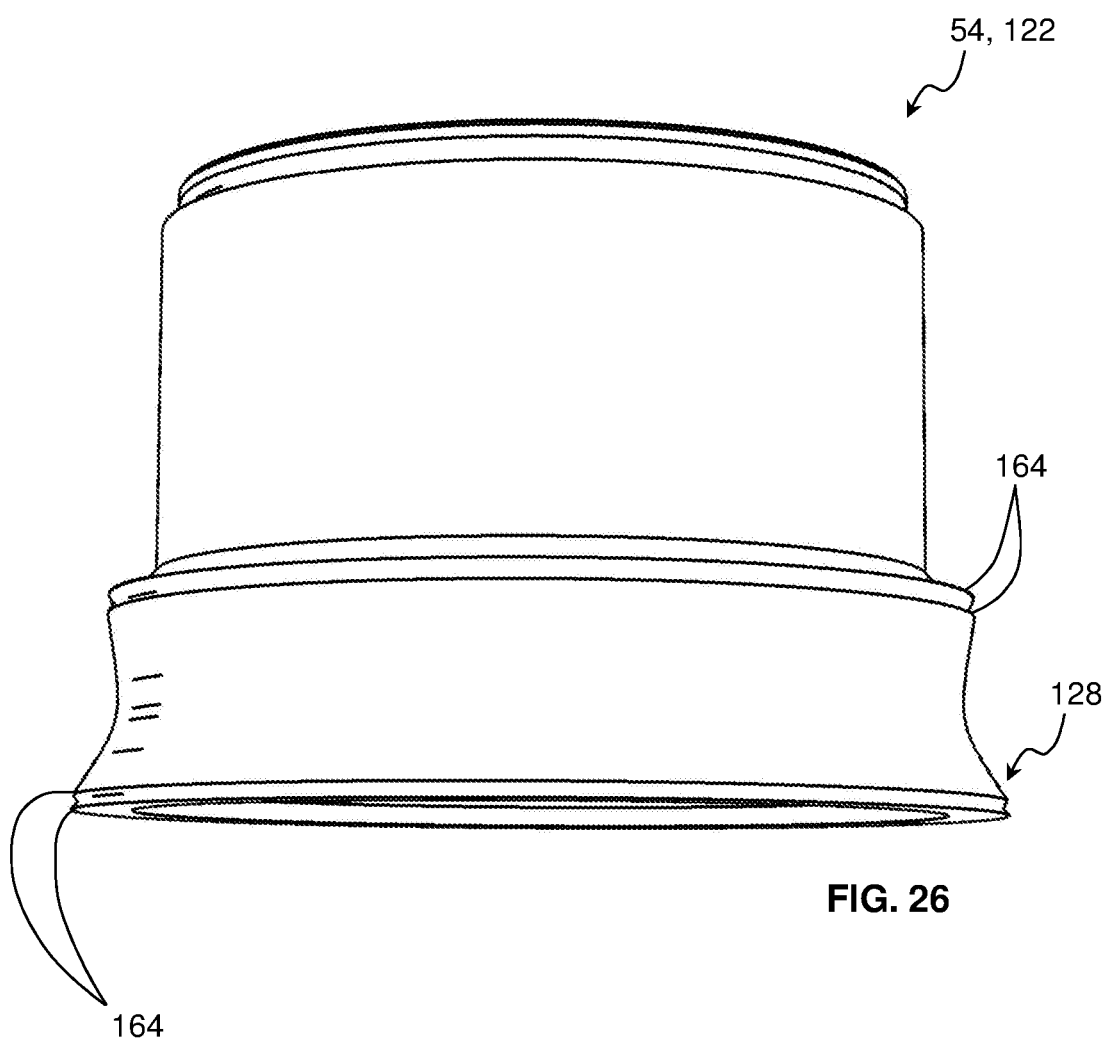
FIG. 26 is a perspective view of a lower portion of an inner wall of the vessel of FIG. 20.

Referring to FIG. 26, close (e.g., aesthetically and/or functionally acceptable) tolerances may be difficult to achieve when combining, joining, centering, etc. parts formed of different materials in different manufacturing processes. Accordingly, in selected embodiments, mating or abutting surfaces of one or more shoulders 126, 128 of an upper portion 120 and/or lower portion 122 may include one or more sacrificial ridges 164.

Sacrificial ridges 164 may be positioned at locations where close tolerances are difficult to achieve such as at interfaces between polymeric inner wall components 54, 120, 122 and a metallic outer wall 56. The material forming the sacrificial ridges 164 may be more easily sanded off, sheared, compressed, or the like during an assembly process. Accordingly, sacrificial ridges 164 may speed the process of achieving an acceptable interface between selected parts or components.

Figure 27:
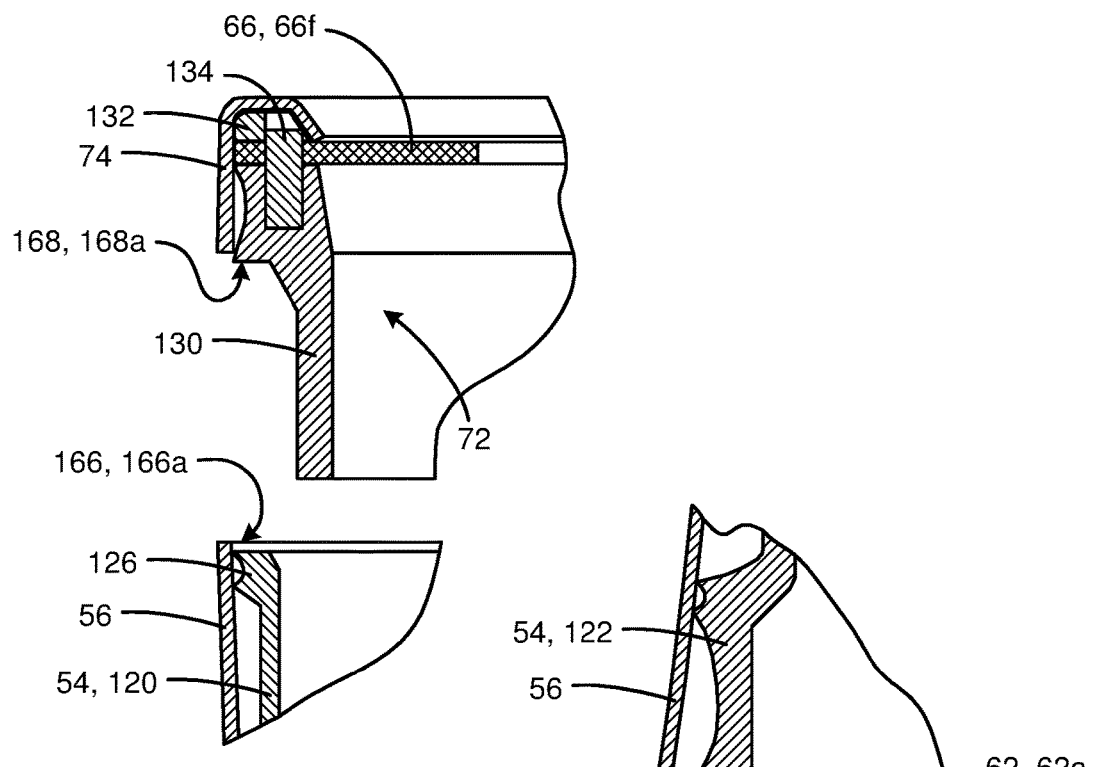
FIG. 27 is a partial, cross-sectional view of the vessel of FIG. 20 with the top removed.
Figure 28:
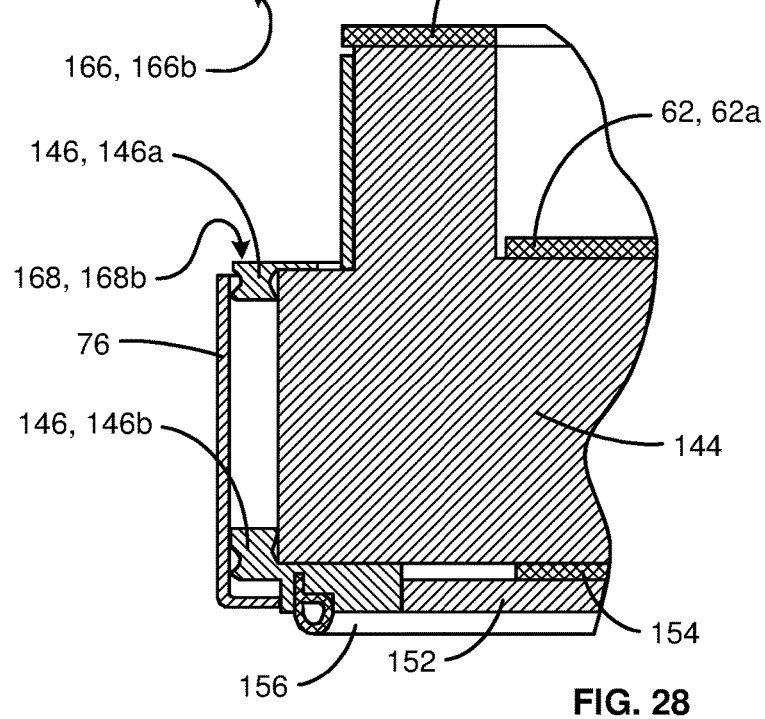
FIG. 28 is a partial, cross-sectional view of the vessel of FIG. 20 with the bottom removed.

Referring to FIGS. 27 and 28, in selected embodiments, a clean and smooth transition may be desired from the outer skin of a top 28 to the outer skin of a body 30 and/or from the outer skin of a body 30 to the outer skin of a base 32. Accordingly, in certain embodiments, a recess 166 may be formed in one part, while a shoulder 168 is formed on the other part. Accordingly, when the two parts come together, the shoulder 168 may extend into the recess 166 and ensure that their respective outer skins align.

For example, in certain embodiments, an outer wall 56 of a body 30 may extend slightly beyond an inner wall 54 at a top portion 38 of the body 30. This may create a first recess 166a at the top portion 38 of the body 30. Conversely, an outer component 74 of a top 28 may be slightly shorter than an adjacent interior component 130. Accordingly, the interior component 130 may form a first shoulder 168a. Thus, when the top 28 is applied to the body 30, the first shoulder 168a may extend within the first recess 166a and register (e.g., center) and align the outer component 74 of the top 28 with the outer wall 56 of the body 30.

Similarly, in certain embodiments, an outer wall 56 of a body 30 may extend slightly beyond an inner wall 54 at a bottom portion 44 of the body 30. This may create a second recess 166b at the bottom portion 44 of the body 30. Conversely, an outer layer 76 of a base 32 may be slightly shorter than an adjacent top interface mechanism 146a. Accordingly, the top interface mechanism 146a may form a second shoulder 168b. Thus, when the base 32 is applied to the body 30, the second shoulder 168b may extend within the second recess 166b and register (e.g., center) and align the outer layer 76 of the base 32 with the outer wall 56 of the body 30.

Figure 29:
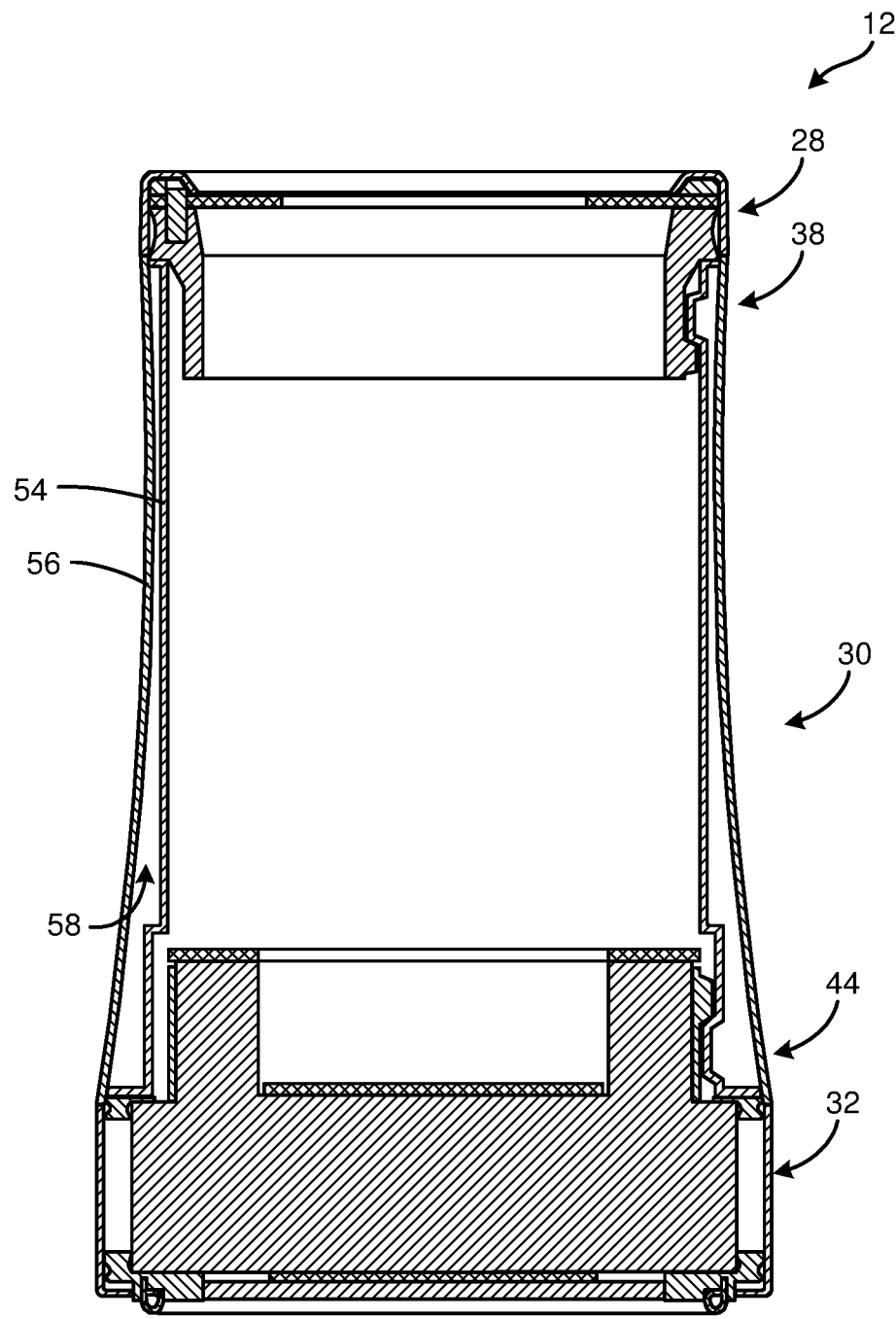
FIG. 29 is a cross-sectional view of another alternative embodiment of a vessel in accordance with the present invention wherein the inner and outer walls of the body are both formed of the same material.

Referring to FIG. 29, in selected embodiments, both an inner wall 54 and an outer wall 56 of a body 30 may be formed of the same material. For example, both an inner wall 54 and an outer wall 56 may be formed of metal (e.g., aluminum, stainless steel, or the like). In embodiments wherein the walls 54, 56 of a body 30 are formed of metal, the walls 54, 56 may be welded together or otherwise sealed where they meet at both the top and bottom portions 38, 44 of the body 30.

Figure 30:
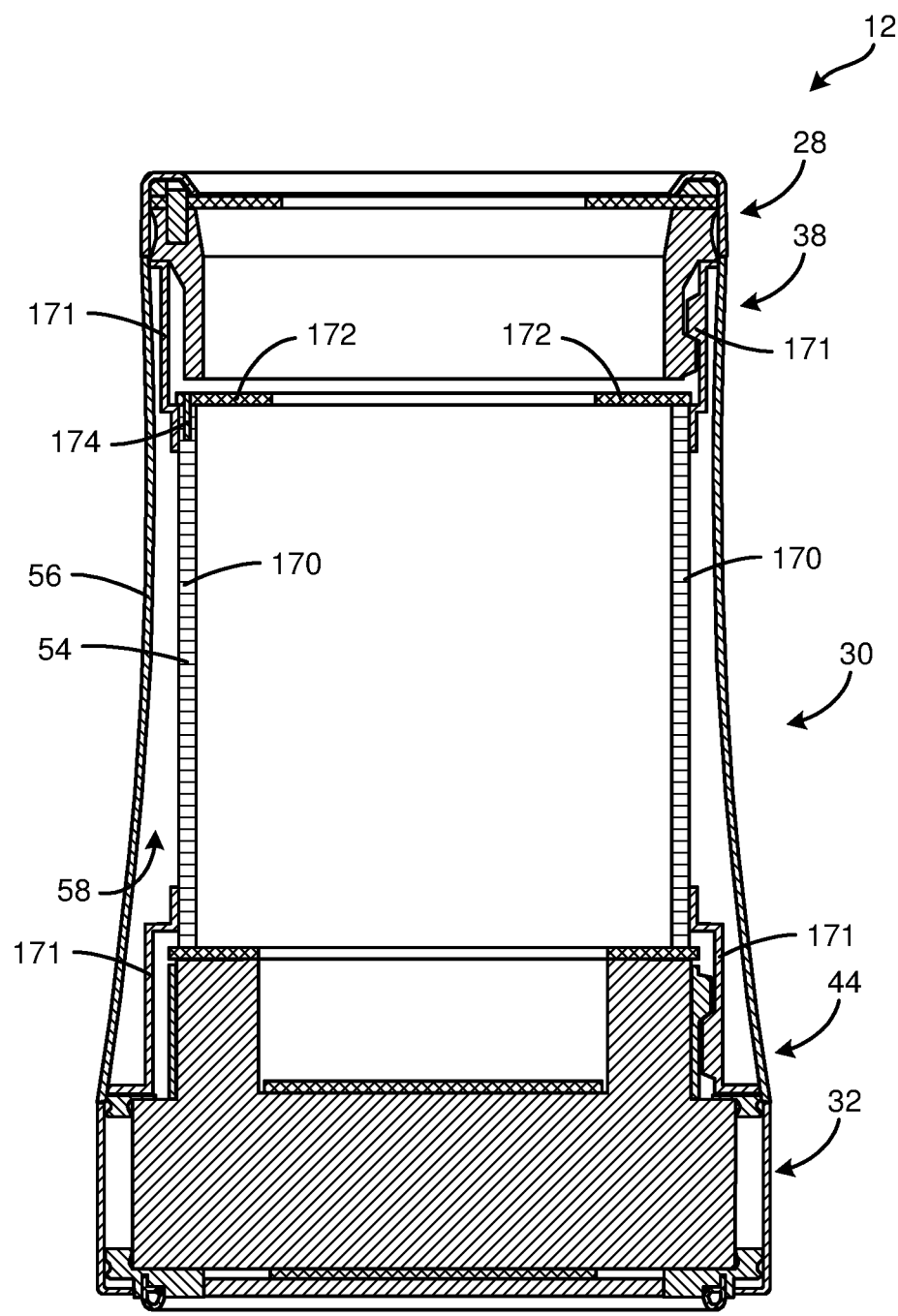
FIG. 30 is a cross-sectional view of another alternative embodiment of a vessel in accordance with the present invention wherein the inner wall of the body is configured to conduct heat to the base.

Referring to FIG. 30, in certain embodiments, an inner wall 54 may be configured to conduct heat from a beverage container 14 to a base 32. In such embodiments, at least a portion 170 of an inner wall 54 may be formed of a material that is thermally conductive (e.g., a metal such as aluminum, copper, or steel). The other portion 171 or portions 171 on an inner wall 54 may be less thermally conductive (e.g., formed of a polymeric material). The conductive portion 170 may be in thermal contact with a base 28 so that heat collected therewithin may be transferred to the base 28.

A heat transfer mechanism 172 may extend from the conductive portion 170 and contact a beverage container 14. Accordingly, heat may be transferred from a beverage container 14 to a heat transfer mechanism 172, from the heat transfer mechanism 172 to a conductive portion 170, and from the conductive portion 170 to a base 32. By removing heat (even a relatively small amount of heat) from a beverage container 14 at a higher location (e.g., at a location spaced above a bottom of a beverage container 14), a vessel 12 may induce convective motion of a beverage within the beverage container 14. This may aid in keeping the beverage within the beverage container 14 at a more uniform temperature by avoiding or limiting thermal stratification. Alternatively or in addition thereto, a conductive portion 170 may aid in keeping a volume of air interior to the inner wall 54 and exterior to the beverage container 14 at a substantially uniform temperature.

In selected embodiments, a heat transfer mechanism 172 may comprise one or more gaskets or annuluses of thermal foam. Each such gasket may include multiple tabs that extend radially inward from the portion 170 to contact a beverage container 14. Accordingly, the gasket may be shaped like the seal 66 illustrated in FIG. 25. Flexibility and resiliency of the thermal foam may enable the tabs of the gasket to extend and contact beverage containers 14 of various sizes.

Figure 31:
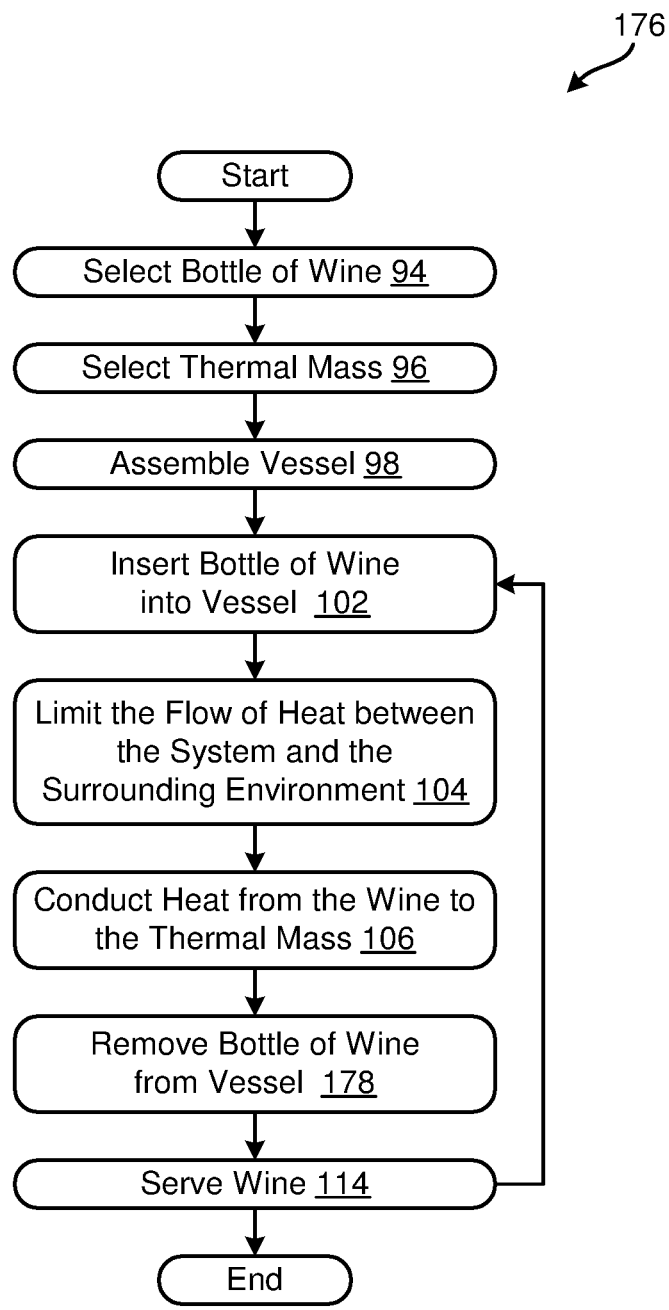
FIG. 31 is a schematic block diagram of an alternative embodiment of a method in accordance with the present invention.

Any suitable mechanism may be used to secure a heat transfer mechanism 172 to a conductive portion 170. In selected embodiments, a plurality of pegs, 174, pins 174, screws 174 or the like may hold a heat transfer mechanism 172 in contact with a conductive portion 170 (e.g., one end of a conductive portion 170), Referring to FIG. 31, in certain embodiments, a method 176 in accordance with the present invention may begin with the selection 94 of a bottle of wine. The bottle of wine may have been stored at a temperature that substantially matches its optimal serving temperature (e.g., the bottle of wine may have been stored in a wine refrigerator or cooler). Accordingly, a user may select 96 a thermal mass that will aid in maintaining the bottle of wine at or near its optimal serving temperature. In selected embodiments, selecting 96 an appropriate thermal mass may comprise selecting a cold base 32 (e.g., a base 32 that has been stored within a refrigerator or freezer).

With an appropriate thermal mass in hand, the user may assemble 98 a vessel 12. This may include attaching the selected base 32 to a body 30 in accordance with the present invention. The bottle of wine that was selected 94 may then be placed 102 or inserted 102 within the vessel 12.

With the bottle within the vessel 12, the vessel 12 may limit 104 the flow of heat between the system 10 (e.g., the cavity 34 and the contents thereof) and the surrounding environment. However, within the vessel 12, heat may be flowing 106 (e.g., flowing 106 relatively slowly due to the limited contact area provided by the thermal foam 62a) from the wine to the thermal mass (e.g., to the core 144 of the base 32 via the thermal conductor 62, 62a).

When desired, the bottle of wine may be removed 178 from the vessel 12 and some portion of the wine contained within the bottle may be served 114. After the serving 114, the bottle of wine may be inserted 102 again within the vessel 12 and various steps 104, 106, 178, 114 of the method 176 may be repeated as desired or necessary (e.g., until the wine is consumed). In selected embodiments, the thermal capacity of a base 32 may be such that two to six bottles of wine may be served without the need to install a fresh, cold base 32 from the freezer.

In such a method 176, the rate of heat transfer out of the beverage container 14 may be sized to combat or cancel out heat incursion into the beverage container 14. Accordingly, as heat slowly enters a beverage container 14 from a surrounding environment, that heat may be conducted away to a cooler base 32 (e.g., a cooler core 144 within a base 32) in order to hold the temperature of the beverage within the beverage container 14 at or near an optimal serving temperature for an extended period of time.

Figure 32:
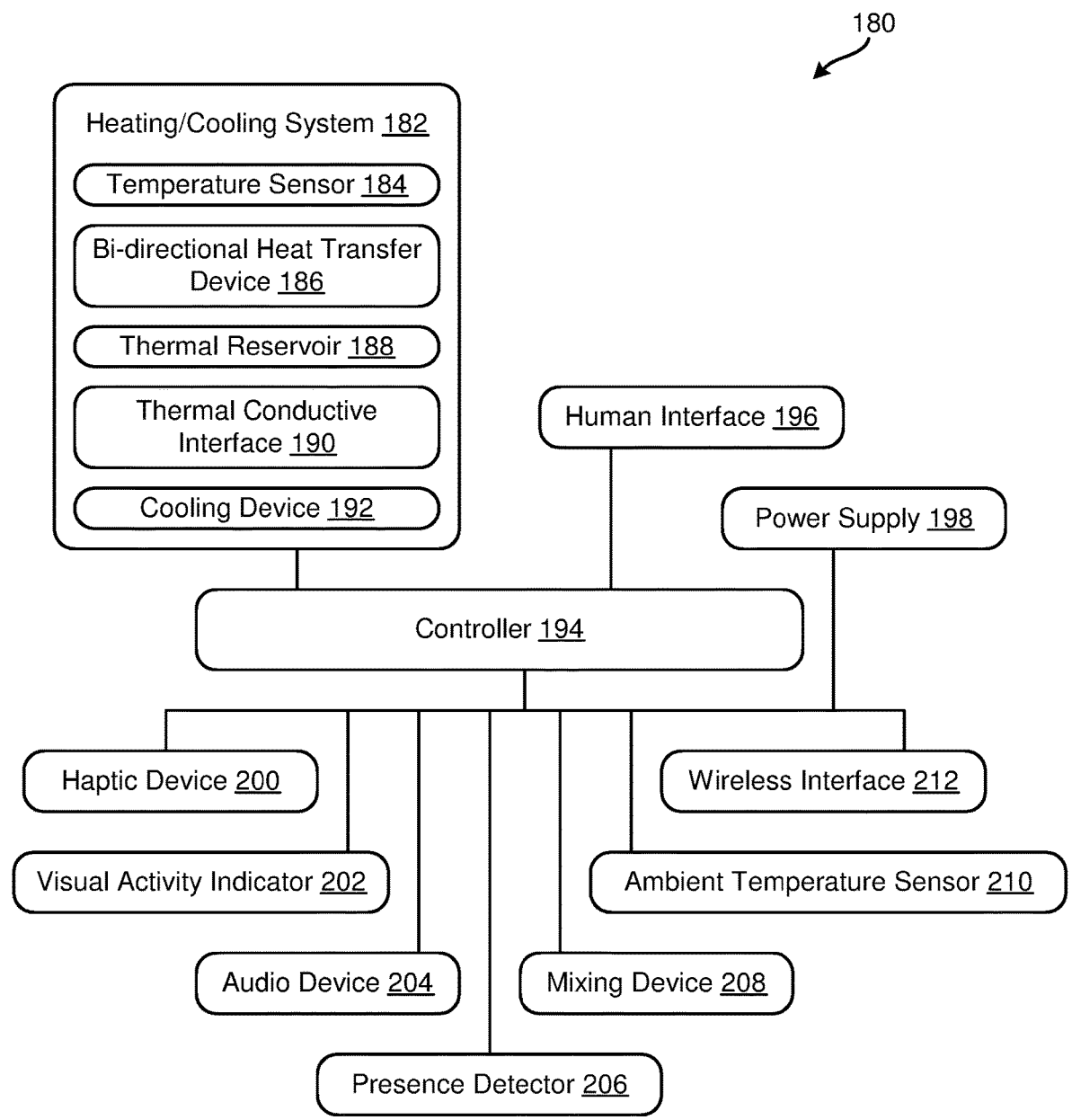
FIG. 32 is a schematic diagram of one embodiment of an on-board, electrically power, heating/cooling system that may form part of a vessel in accordance with the present invention.

Referring to FIG. 32, in selected embodiments, a system 10 may use an electrical system 180 to regulate the temperature of a beverage container 14 and its contents. In such embodiments, an electrical system 180 may fit within or form a base 32. Holes through an exterior of a base 32 may allow air flow as needed to support the function of the electrical system 180.

In certain embodiments, an electrical system 180 may include a heating/cooling system 182 comprising one or more temperature sensors 184, a bi-directional heat transfer device 186, a thermal reservoir 188, a thermal conductive interface 190, a cooling device 192, or the like or a combination or sub-combination thereof. A temperature sensor 184 may comprise an active device, variable resistor, thermocouple, infrared sensor, thermistor, or the like. An electrical system 180 may use data collected by one or more temperature sensors 184 to know when to turn a heating/cooling system 182 or one or more components thereof on and/or off.

A bi-directional heat transfer device 186 may create a temperature differential using the Peltier effect, some other thermoelectric effect, or the like. A thermal reservoir 188 may support the operation of a bi-directional heat transfer device 186 by providing a location for heat generated by that device 186 to go or the like. A thermal reservoir 188 may comprise a heat sink (e.g., a relatively large thermal mass), cooling fins, eutectic system, or the like.

A thermal conductive interface 190 may assist in conducting heat to or from a bi-directional heat transfer device 186 (e.g., from a beverage container 14 to a cool side of a bi-directional heat transfer device 186). In selected embodiments, a thermal conductive interface 190 may comprise thermal foam, a heat pipe, liquid, thermal grease, or the like. A cooling device 192 may enable a system 180 to exhaust or intake heat to or from a surrounding environment. For example, a cooling device 192 may comprise a fan, pump, or the like that moves a fluid (e.g., air) past the cooling fins of a thermal reservoir 188.

An electrical system 180 may include a controller 194 for controlling operation of the electrical system 180 or one or more components thereof. In selected embodiments, a controller 194 may be an embedded microcontroller, analog control circuit, digital temperature controller, or the like.

An electrical system 180 may include a user interface 196 that allows a human user to turn the electrical system 180 on or off, control or set one or more temperature settings, or the like. A user interface 196 may include one or more switches, a keypad, a dial, a touch screen, or the like or a combination or sub-combination thereof.

An electrical system 180 may further include a power supply 198, one or more haptic feedback devices 200, one or more visual indicators 202, one or more audio devices 204, one or more presence detectors 206, a mixing device 208, one or more ambient temperature sensors 210, a wireless communication interface 212, or the like or a combination or sub-combination thereof.

A power supply 198 may supply the electrical power needed by the various components of an electrical system 180. In selected embodiments, a power supply 198 may include one or more batteries (e.g., rechargeable AA batteries or the like) and one or more ports or other mechanisms (e.g., AC plugs, DC plugs, wall adapters, power over Ethernet systems, inductive charging systems, lighting ports, USB plugs, or the like or a combination or sub-combination thereof) delivering power to recharge the one or more batteries.

A haptic feedback device 200 may include a vibrator, buzzer, crystal, or the like that provides feedback to a human user regarding the operation of an electrical system 180. A visual activity indicator 202 may include one or more lights (e.g., one or more LEDs, OLEDs, LCDs, or the like) that provide feedback to a human user regarding the operation of an electrical system 180. An audio device 204 may include an annunciator, speaker, buzzer, bell, speech generator, or the like that provides feedback to a human user regarding the operation of an electrical system 180.

A presence detector 206 may detect when some condition is met for starting and/or stopping some operation of an electrical system 180. For example, a presence detector 206 may detect when a beverage container 14 has been placed in a vessel 12 and cooling of that beverage container 14 should be initiated or reinitiated.

A mixing device 208 may generate vibrations (e.g., ultrasonic vibrations) that may be applied or conducted to a beverage container 14 to aid in mixing a beverage within that container 14. Accordingly, a mixing device 208 may reduce thermal stratification of a beverage within a beverage container 14.

An ambient temperature sensor 210 may provide information characterizing an ambient temperature to a controller 194. A controller 194 may used that information in any way that supports operation of an electrical system 180 in accordance with the present invention. For example, in selected embodiments, a controller 194 may use information characterizing a current state of charge and an ambient temperature to predict (and report to a human user) how much longer the electrical system 180 will be able to maintain a beverage container 14 at a desired or set temperature.

A wireless interface 212 may support wireless communication with one or more exterior systems. Accordingly, via a wireless interface 212, an electrical system 180 may communication with a mobile device, computer system, or the like. Accordingly, information may be transferred into or out of an electrical system 180 via a wireless interface 212. In selected embodiments, a wireless interface 212 may comprise or support Bluetooth, WiFi, Zigbee, IOT, one or more other communication protocols, or the like or a combination or sub-combination thereof.

In selected embodiments, an electrical system 180 in accordance with the present invention may provide enough power to run the components of a heating/cooling system 182 for about four hours or more when pulse-width modulation is employed. A base 32 comprising an electrically powered cooling/heating system 180 may operate in cooperation with a stylized induction charging/power platform that may support a vessel 12 when it is charging. The charging/power platform or the electrically powered cooling/heating system 180 may play a song, light up, buzz, or the like when the corresponding vessel 12 reaches the right temperature. Then, the vessel 12 may be removed from the charging platform and placed on a table. Thus, temperature regulation when the vessel 12 is off of a charging/power platform may correspond to drift-reduction mode or may be provided by an electrical system 180 running off battery power.

In selected embodiments, a vessel 12 may achieve the desired temperature without being connected to the charging/power platform via a combination of battery power and a heat sink/source as disclosed above.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
   obtaining a container containing a beverage, the container and the beverage having a combined weight;
   assembling a vessel after the obtaining of the container, the assembling comprising
   obtaining an upper portion of the vessel, the upper portion comprising a removable top and a double walled tube, the double walled tube comprising a top opening, a bottom opening opposite the top opening, an open interior extending all through the double walled tube from the top opening to the bottom opening, an inner wall, an outer wall, and a sealed off volume located between the inner wall and the outer wall, the sealed off volume vacuum insulating the inner wall from the outer wall by containing gas molecules at a pressure below atmospheric pressure, the removable top partially closing off the top opening of the double walled tube and comprising an annular frame and an annular seal, the annular frame mechanically engaging an inner surface of the inner wall of the double walled tube to removably secure the removable top to the double walled tube, the annular seal being formed of elastomeric material and having a plurality of tabs extending radially inward away from the annular frame toward a central axis of the double walled tube, obtaining, from within a refrigerator or freezer, a removable base in a chilled condition and not attached to the double walled tube, and attaching, after the obtaining of the removable base, the removable base to the double walled tube such that the removable base closes off the open interior of the double walled tube at the bottom opening thereof;

inserting, after the assembling and while the removable base is in the chilled condition and attached to the double walled tube, the container within the vessel so that the combined weight rests on the removable base and a portion of the container extends out of the top opening of the double walled tube; and conducting heat from the container to the removable base.

2. The method of claim 1, further comprising:

removing, after the conducting, the container from the vessel;

serving, after the removing, a portion of the beverage by pouring the portion out of the container; and reinserting, after the serving, the container within the vessel.

3. The method of claim 1, wherein an inner diameter of the annular seal is in the range from about 65 mm to about 85 mm.

4. The method of claim 1, wherein:

the removable base comprises a core of solid metal and an annular cylinder of solid metal extending upward from the core of solid metal: and the attaching comprises effecting a direct mechanical engagement between the annular cylinder of solid metal and an inner surface of the inner wall of the double walled tube to removably secure the removable base to the double walled tube.

5. The method of claim 1, wherein:

the removable base comprises a core of solid metal and an annular cylinder of solid metal extending upward from the core of solid metal;

a top surface of the annular cylinder of solid metal is at a first height;

a top surface of the core of solid metal is located within the annular cylinder of solid metal and at a second height lower than the first height;

the removable base comprises first thermal foam directly overlaying the top surface of the annular cylinder of solid metal and second thermal foam directly overlaying the top surface of the core of solid metal; and the conducting comprises conducting heat from the container either (1) through the first thermal foam and annular cylinder of solid metal and into the core of solid metal or (2) through the second thermal foam and into the core of solid metal.

6. The method of claim 1, further comprising occupying, by each of the plurality of tabs during the conducting, a neutral, undeflected position.

7. The method of claim 6, wherein:

the inserting comprises deflecting one or more tabs of the plurality of tabs out of the neutral, undeflected position thereof; and the method further comprises resiliently returning, by the one or more tabs, to the neutral, undeflected position thereof after the inserting.

8. The method of claim 6, further comprising restricting, by the annular seal during the conducting, air exchange between an ambient environment and a space located interior to the inner wall of the double walled tube and exterior to the container.

9. The method of claim 1, further comprising:

removing heat from the container at a location spaced above a bottom of the container; and inducing, by the removing, a convection current within the beverage.

10. The method of claim 1, wherein:

at least a portion of the inner wall is formed of a thermal conductor; and the method further comprises keeping, by the at least a portion of the inner wall, a volume of air interior to the inner wall and exterior to the container at a substantially uniform temperature.

* * * * *